(12) United States Patent
Salomons et al.

(10) Patent No.: US 8,809,432 B2
(45) Date of Patent: Aug. 19, 2014

(54) REUSABLE PRINT MEDIUM AND METHOD OF MANUFACTURING THEREOF

(71) Applicant: OCE Technologies B.V., Venlo (NL)

(72) Inventors: Otto W. Salomons, Venray (NL); Franciscus H. M. Stappers, Broekhuijzen (NL); Ronald Groothuijse, Sevenum (NL); Peter R. Markies, Grubbenvorst (NL)

(73) Assignee: OCE Technologies B.V., Venlo (NL)

( * ) Notice: Subject to any disclaimer, the term of this patent is extended or adjusted under 35 U.S.C. 154(b) by 0 days.

(21) Appl. No.: 13/683,815

(22) Filed: Nov. 21, 2012

(65) Prior Publication Data
US 2013/0137805 A1 May 30, 2013

(30) Foreign Application Priority Data

Nov. 25, 2011 (EP) .................................. 11190672

(51) Int. Cl.
| | | |
|---|---|---|
| *C08K 5/07* | (2006.01) | |
| *C08K 5/00* | (2006.01) | |
| *B41M 7/00* | (2006.01) | |
| *C09D 167/00* | (2006.01) | |
| *B41M 5/00* | (2006.01) | |
| *G03G 7/00* | (2006.01) | |
| *C09D 167/02* | (2006.01) | |
| *B41M 5/52* | (2006.01) | |

(52) U.S. Cl.
CPC ........... *C09D 167/02* (2013.01); *B41M 7/0009* (2013.01); *C09D 167/00* (2013.01); *B41M 5/5272* (2013.01); *B41M 5/0017* (2013.01); *B41M 2205/18* (2013.01); *G03G 7/0046* (2013.01); *B41M 5/5263* (2013.01); *G03G 7/0006* (2013.01)

USPC .......................................... 524/356; 524/220

(58) Field of Classification Search
CPC ............................ C09D 167/00; C09D 167/02
USPC .......................................... 524/356, 220, 290
See application file for complete search history.

(56) References Cited

U.S. PATENT DOCUMENTS

| | | | |
|---|---|---|---|
| 4,990,364 A | 2/1991 | Bolte et al. | |
| 5,968,301 A | 10/1999 | Murakami et al. | |
| 7,084,190 B2 * | 8/2006 | Everhardus et al. | 523/160 |

FOREIGN PATENT DOCUMENTS

| | | |
|---|---|---|
| EP | 0 270 831 A2 | 6/1988 |
| EP | 0852345 A2 | 7/1998 |
| EP | 1 020 771 A2 | 7/2000 |
| WO | WO 2011/138432 A1 | 11/2011 |

* cited by examiner

*Primary Examiner* — Hui Chin
(74) *Attorney, Agent, or Firm* — Birch, Stewart, Kolasch & Birch, LLP

(57) ABSTRACT

Disclosed is a reusable print medium having a substrate and a sacrificial layer. The sacrificial layer contains a hotmelt composition at least having an amorphous material. The amorphous material is a reaction product of a first monomer A, said first monomer A being a polyhydroxyl alcohol comprising X hydroxyl functional groups, wherein X≥2, monomer A optionally comprises a primary or secondary amine functionality; a second monomer B, being an aromatic monocarboxylic acid; a third monomer C, said third monomer C being able to form an ester linkage with an alcohol and/or an amide linkage with a primary or secondary amine; and optionally, a fourth monomer D, being an aromatic monocarboxylic acid different from the second monomer B. Also disclosed is a method of manufacturing a reusable print medium, a method of printing and recycling a print medium and an apparatus for printing and recycling a print medium.

18 Claims, 4 Drawing Sheets

REUSABLE PRINT MEDIUM AND METHOD OF MANUFACTURING THEREOF

FIELD OF THE INVENTION

The present invention relates to a reusable print medium comprising a substrate and a sacrificial layer. The sacrificial layer including an image printed thereon may be removed from the substrate, where after a new sacrificial layer may be applied on the substrate to form a print medium ready to be reused.

BACKGROUND ART

It is known in the art to use sacrificial layers on print media for recycling purposes. For example EP 1020771 discloses the use of a surface layer comprising a water-swelling resin that can be removed together with a printed image by immersing the print medium in an aqueous medium.

A disadvantage of the known reusable print media is that water or in general solvents are required to remove the sacrificial layers with the images printed thereon. The recycling process requires multiple steps and the substrates need to be dried before reuse. Moreover using solvents to remove the sacrificial layer is not considered an environmental friendly way of recycling, even if the solvent is water because removed ink or toner residues have to be recovered from the solvent in an energy consuming separation step.

It is an object of the present invention to overcome or at least mitigate the above stated disadvantages by providing a reusable print medium that may be recycled without using solvents.

SUMMARY OF THE INVENTION

This object is at least partly achieved by providing a reusable print medium comprising a substrate and a sacrificial layer, the sacrificial layer comprising a hotmelt composition, wherein the hotmelt composition comprises an amorphous material which is a resin being a reaction product of a first monomer A, said first monomer A being a polyhydroxyl alcohol comprising X hydroxyl functional groups, wherein X≥2, monomer A optionally comprises a primary or secondary amine functionality; a second monomer B, being an aromatic monocarboxylic acid; a third monomer C, said third monomer C being able to form an ester linkage with an alcohol and/or an amide linkage with a primary or secondary amine; and optionally, a fourth monomer D, being an aromatic monocarboxylic acid different from the second monomer B.

In the context of the present invention, a hotmelt composition is defined as a composition that is solid at room temperature and liquid at elevated temperature. Compositions of this kind are also known as phase change compositions.

A print medium according to the present invention can be reused by heating the print medium such that the sacrificial layer at least partly liquefies and subsequently stripping the sacrificial layer including the image printed thereon from the substrate.

An additional advantage of a sacrificial layer according to the present invention is that it provides an intermediate layer between a substrate and a marking material (ink or toner). Therefore, many materials can be printed on as long as the material used for the sacrificial layer shows good adhesion towards both the used print substrate and the used marking material.

In an embodiment, amorphous material has a glass transition temperature ($T_g$) of between −10° C. and 55° C.

In an embodiment, the hotmelt composition has a viscosity (q) of below 150 mPa·s at 150° C.

The hotmelt composition for use as a sacrificial layer according to the present invention may comprise:

20 wt %-100 wt % of an amorphous material having a glass transition temperature ($T_g$) of between −10° C. and 55° C.;

0 wt %-70 wt % of a crystalline material;

0 wt %-10 wt % of a gelling agent;

0 wt %-10 wt % of a germinating agent;

0 wt %-10 wt % of a colorant;

0 wt %-10 wt % of a surfactant.

Therefore, in an embodiment, the sacrificial layer comprises at least an amorphous material having a glass transition temperature ($T_g$) of between −10° C. and 55° C.

Characteristic of such a hotmelt composition is that it has a sharp phase transition, meaning that the composition changes from a solid to a low viscous liquid in a narrow temperature range, e.g. the composition is solid at room temperature and liquid at 50° C.

Such a hotmelt composition may be applied onto a substrate as a sacrificial layer onto which an image may be printed. At elevated temperatures, the sacrificial layer at least partly liquefies such that the sacrificial layer including the printed toner or ink image may be easily stripped from the substrate e.g. by wiping or scraping. The print medium may also be heated to such an extent, that only a first fraction of the sacrificial layer near the interface between the substrate and the sacrificial layer melts, while a second fraction of the sacrificial layer located on top of the first fraction of the sacrificial layer may remain solid. In this way a more or less continuous film comprising the second fraction of the sacrificial layer and the toner or ink image printed thereon, as it were, may float on a liquefied first fraction of the sacrificial layer, which film may be easily removed by peeling it off the substrate. The liquid residue of the first fraction of the sacrificial layer may be removed by e.g. wiping or scraping. However, said liquid may also be left on the substrate and a new sacrificial layer may be reapplied thereon. This may be accomplished by heating the print medium with radiation that penetrates the sacrificial layer (requiring transparency of the sacrificial layer with respect to the used radiation, e.g. infra red (IR) radiation) and heats the substrate (e.g. by absorption).

The print medium may also be heated from the backside to accomplish the same. Therefore, reusable print media according to the present invention may be recycled by applying heat to remove the sacrificial layer and the image printed thereon.

In an embodiment, the amorphous material preferably has a glass transition temperature of between −5° C. and 50° C., preferably between 0° C. and 45° C., more preferably between 5° C. and 40° C., even more preferably between 10° C. and 35° C.

In an embodiment, the hotmelt composition has a viscosity (q) of below 150 mPa·s at 150° C., preferably below 90 mPa·s at 150° C., more preferably between 5 mPa·s and 50 mPa·s at 150° C., even more preferably between 8 mPa·s to 25 mPa·s at 150° C. The lower the viscosity, the easier the sacrificial layer may be removed after heating slightly above the melting point of the resin.

In an embodiment, the hotmelt composition has a melting region starting from a temperature of between 30° C. and 180° C., preferably between 45° C. and 150° C., more preferably between 50° C. and 140° C., even more preferably between 60° C. and 135° C.

In an embodiment, the hotmelt composition and in particular the amorphous material is water insoluble. Print media according to this embodiment, i.e. print media comprising a water insoluble sacrificial layer are particularly suitable for outdoor use. In particular when such print media are printed with a printing technique that provides good resistance to weather conditions, for example printing with toner, hotmelt ink or UV-curable ink.

Amorphous Material

In an embodiment the amorphous material may be a monomer or oligomer amorphous material which may be selected from the group consisting of the compounds shown in Table 1 and Table 2.

TABLE 1

Selection of monomer and oligomer amorphous materials

| No. | Formula (abbreviation) | $T_g$ (° C.) |
|---|---|---|
| I | $C(CH_2-O-\overset{O}{\underset{\|}{C}}-R)_4$ | |
| 1 | R = $C_6H_5$— (PETB) | 19 |
| 2 | R = ortho $CH_3$—$C_6H_5$— (PET2T) | −2 |
| 3 | R = meta $CH_3$—$C_6H_5$— (PET3T) | 7 |
| 4 | R = para $CH_3$—$C_6H_5$— (PET4T) | 27 |
| 5 | R = meta/para (15/85) $CH_3$—$C_6H_5$— (PET3,4T) | 22 |
| 6 | R = para $CH_3O$—$C_6H_5$— (PET-ANI) | 32 |
| II | $(R-\overset{O}{\underset{\|}{C}}-O-CH_2)_3-C-CH_2-O-CH_2-C-(CH_2-O-\overset{O}{\underset{\|}{C}}-R)_3$ | |
| 7 | R = $C_6H_5$— (di-PETB) | 29 |
| 8 | R = ortho $CH_3$—$C_6H_5$ (di-PET2T) | 10 |
| 9 | R = meta $CH_3$—$C_6H_5$— (di-PET3T) | 15 |
| 10 | R = para $CH_3$—$C_6H_5$— (di-PET4T) | 37 |
| 11 | R = para $CH_3O$—$C_6H_5$— (di-PET-ANI) | 44 |
| 12 | R = $C_6H_5O$— di-PET-PC | 30 |
| III | (isophorone diurethane structure with $H_3C$, $CH_2$—NH—C(=O)—OR, RO—C(=O)—NH— on cyclohexane with $CH_3$, $CH_3$) | |
| 13 | R = iso-$C_3H_7$— (IPDI-IPA) | 24 |
| 14 | R = $CH_3$— (IPDI-MA) | 30 |
| 15 | R = $C_2H_5$— (IPDI-EA) | 10 |
| 16 | R = $C_6H_5$—$CH_2$— (IPDI-BA) | 20 |
| IV | RO—C(=O)—NH—(cyclohexyl)—$CH_2$—(cyclohexyl)—NH—C(=O)—OR | |
| 17 | R = $C_6H_5$—$CH_2$— (CMDI-BA) | 14 |
| 18 | R = $C_6H_5$—$CH_2$—$CH_2$— (CMDI-PEA) | 13 |

TABLE 1-continued

Selection of monomer and oligomer amorphous materials

| No. | Formula (abbreviation) | $T_g$ (° C.) |
|---|---|---|
| V | RO—C(=O)—NH—C$_6$H$_4$—CH$_2$—C$_6$H$_4$—NH—C(=O)—OR | |
| 19 | R = iso-C$_3$H$_7$— (MDI-IPA) | 27 |
| 20 | R = CH$_3$O—CH$_2$—CH$_2$— (MDI-MEG) | 3 |
| VI | R—C$_6$H$_4$—O—CH$_2$—CH(OH)—CH$_2$—O—C$_6$H$_4$—C(CH$_3$)$_2$—C$_6$H$_4$—O—CH$_2$—CH(OH)—CH$_2$—O—C$_6$H$_4$—R | |
| 21 | R = C$_6$H$_5$— (PBPA-PP) | 45 |
| 22 | R = C$_6$H$_{11}$— (PBPA-CHP) | 39 |
| 23 | R = tert C$_5$H$_{11}$— (PBPA-AP) | 30 |
| 24 | R = tert C$_4$H$_9$— (PBPA-BuP) | 28 |
| VII | 2,2'-biphenyl bis(OC(=O)R) | |
| 25 | R = para CH$_3$O—C$_6$H$_5$— (BIPANI) | 25 |
| 26 | R = ortho CH$_3$—C$_6$H$_5$— (BIP2T) | −4 |
| 27 | R = meta CH$_3$—C$_6$H$_5$— (BIP3T) | −1 |
| 28 | R = para CH$_3$—C$_6$H$_5$— (BIP4T) | 17 |
| 29 | R = C$_6$H$_5$O— (BIPPC) | 12 |
| VIII | Glycerol tri[(C$_3$H$_6$O)$_x$—C(=O)—NH—cyclohexyl] | |
| 30 | $x \approx 1$ (GLYPOCHI) | 17 |

TABLE 1-continued

Selection of monomer and oligomer amorphous materials

| Formula No. | (abbreviation) | $T_g$ (° C.) |
|---|---|---|
| IX | | |
| 31 | $x \approx 1$ (PETPOCHI) | 23 |
| X | | |
| 32 | (DITRIM-50CHI) | 28 |
| XI | | |
| 33 | (BEMDAP) | 28 |

Table 1 shows a selection of amorphous monomer and oligomer materials which can be used in a hotmelt composition according to the invention. Part I of this Table gives compounds of pentaerythritol: compound 1 is pentaerythritol tetrabenzoate, compounds 2, 3 and 4 are respectively the ortho, meta and para toluate ester, and compound 5 is a statistical synthetic mixture of the meta and para toluate compounds, 6 is the tetra-anisilate compound. Compounds 9 to 12 shown in part II of the Table are partly analogous di-pentaerythritol compounds. Compound 12 is the hexa-carbonate compound of di-pentaerythritol.

Part III of Table 1 shows compounds of isophorone diisocyanate with an aliphatic alcohol (e.g. isopropyl alcohol, methyl alcohol, ethyl alcohol) or aromatic alcohol (e.g. benzyl alcohol).

The compounds of 4,4' dicyclohexylmethane diisocyanate with an alcohol (benzyl alcohol and phenyl ethyl alcohol) are shown in part IV of Table 1.

Part V of this Table gives data on a number of other bis-urethanes on the basis of diphenylmethane diisocyanate and an alcohol.

Part VI shows the data concerning a number of reaction products of the diglycidyl ether of bis-phenol A with, respectively, para-phenol (21), para-cyclohexyl phenol (22), para-tert-amyl phenol (23) and para-tert-butyl phenol (24).

Part VII of the Table shows compounds derived from 2,2'-biphenol. Respectively the esters of biphenol with methoxybenzoic acid (25), ortho-, meta- and paramethylbenzoic acid (26, 27, 28) and the phenyl carbonate of biphenol (29).

Part VIII gives urethanes derived from propoxylated glycerol and cyclohexyl isocyanate (30). It relates to a mixture of substances which has a specific glass transition temperature depending on the average value of x. When x is approximately equal to 1, this temperature is 17° C.

Part IX shows urethanes derived from pentaerythritol and cyclohexyl-isocyanate (31). When x is on average approximately equal to 1, a mixture of urethanes of this kind has a glass transition temperature of 23° C.

Part X gives a mixture of urethanes on the basis of di-trimethylolpropane and 50 mole equivalents cyclohexyl isocyanate (32). Finally, part XI gives the compound N,N'-bis-(benzoyl)-2-methyl-1,5-diaminopentane (33).

TABLE 2

Selection of commercially available oligomer and polymer amorphous materials

| No. | Name (manufacturer) | chemical description | $T_g$ (° C.) | Mw (g/mol) |
|---|---|---|---|---|
| 1 | Foral 85E (Hercules) | glycerol-ester of hydrogenated rosin | 37 | 1000 |
| 2 | Foralyn 110 (Hercules) | pentaerythritol-ester of hydrogenated rosin | 54 | 1300 |
| 3 | Uratak 68520 (DSM) | phenolic poly-α-methyl-styreen | 37 | 880 |
| 4 | Crystalbond 509 (Printlas) | polyethylene phthalate | 30 | 4000 |
| 5 | Dynacoll 7110 (Hüls) | copolyester | 10 | 2000 |
| 6 | Dynacoll 7130 (Hüls) | copolyester | 27 | 7100 |
| 7 | Dynacoll 7150 (Hüls) | copolyester | 46 | 6100 |

TABLE 2-continued

Selection of commercially available oligomer and polymer amorphous materials

| No. | Name (manufacturer) | chemical description | $T_g$ (° C.) | Mw (g/mol) |
|---|---|---|---|---|
| 8 | Kunstharz AP (Hüls) | acetophenone formaldehyde condensation product | 47 | 1100 |
| 9 | Kunstharz SK (Hüls) | reduced acetophenone formaldehyde condensation product | 89 | 1350 |
| 10 | Kunstharz CA (Hüls) | cyclohexanone aldehyde condensation product | 69 | 1050 |
| 11 | Kunstharz EP-TC (Hüls) | ketone aldehyde condensation product | 28 | 750 |

Table 2 shows a selection of commercially available amorphous oligomer and polymer materials which can be used in a hotmelt composition according to the invention.

In an embodiment, the amorphous material comprises a resin being a reaction product of at least a first monomer A and a second monomer B. Said first monomer A being a polyhydroxyl alcohol comprising X hydroxyl functional groups, wherein X≥2, monomer A optionally comprises a primary or secondary amine functionality. Said second monomer B being an aromatic monocarboxylic acid. Optionally the amorphous resin is a reaction product of A, B and a third monomer C. Said third monomer C being able to form an ester linkage with an alcohol and/or an amide linkage with a primary or secondary amine. Optionally, the amorphous resin is a reaction product of monomers A, B and C as mentioned here above and a fourth monomer D, being an aromatic monocarboxylic acid different from the second monomer B.

First Monomer A: Polyhydroxyl Alcohol

The first monomer A comprises at least two hydroxyl functional groups, which are able to form ester linkages upon chemical reaction with a suitable compound. At least one of the hydroxyl functional groups of the first monomer A may be bonded via an ester linkage to the second monomer B. The nature of the latter compounds will be described in more detail later. A function of the first monomer A in the copolymer may be to function as a backbone. The backbone serves to connect the several components of the copolymer. The amorphous resin as used in the present invention may comprise one backbone or may comprise a plurality of interconnected backbones. The number of polyhydroxyl alcohols present, functioning as backbone of the copolymer, may be controlled by controlling relative amounts of each of the first, second and third monomer used in the process for preparing the copolymer, thereby controlling the stoichoimetry of the reaction. When the first monomer A comprises at least three hydroxyl functional groups, a branched copolymer, instead of a linear copolymer may be formed. Optionally, the first monomer A may comprise a primary or secondary amine functionality. Such a monomer may also result in branched copolymers, because such monomers contain three reactive sites: two hydroxyl functionalities and one amine functionality.

Suitable polyhydroxyl alcohols may be selected or derived from, but are not limited to: glycerol, pentaerythritol, dipentaerythritol, 2-(hydroxymethyl)-2-methylpropane-1,3-diol, 2-ethyl-2-(hydroxymethyl)propane-1,3-diol, 2-(hydroxymethyl)propane-1,3-diol, trimethylolethane, trimethylolpropane, trimethylolbutane, trimethylolpentane and diisopropanol amine.

Second Monomer B and Optional Fourth Monomer D: Aromatic Monocarboxylic Acid

The aromatic monocarboxylic acids may comprise a carboxylic acid functional group and may be able to form an ester linkage and or an amide linkage. The ester linkage may be formed either between the aromatic monocarboxylic acid and the first monomer A, or between the aromatic monocarboxylic acid and the third monomer C. By forming an ester linkage using a monocarboxylic acid, the polymer is terminated; no other ester linkage may be formed, thereby controlling the molecular weight $M_w$ of the copolymer. Without wanting to be bound to any theory, the fact that the monocarboxylic acid is an aromatic monocarboxylic acid and therefore comprises a rigid aromatic moiety, is believed to provide the resulting copolymer with rigidity. The monocarboxylic acid may also form a primary or secondary amide linkage with the primary or secondary amine group optionally present in the first monomer A. The polymer is then also terminated as described above.

The aromatic monocarboxylic acids may be selected or derived from, but are not limited to: benzoic acid, 2-methylbenzoic acid, 3-methylbenzoic acid, 4-methylbenzoic acid, 2,3-dimethylbenzoic acid, 2,6-dimethylbenzoic acid, 3-5-dimethylbenzoic acid, 2-4-6-trimethylbenzoic acid, 2-$^{tert}$butylbenzoic acid, 3-$^{tert}$butylbenzoic acid, 4-$^{tert}$butylbenzoic acid, 3,5-di$^{tert}$butylbenzoic acid, 2,3-di$^{tert}$butylbenzoic acid, 2-methoxybenzoic acid, 3-methoxybenzoic acid, 4-methoxybenzoic acid, 2,3-dimethoxybenzoic acid, 2,4-dimethoxybenzoic acid, 2,5-dimethoxybenzoic acid, 3,5-dimethoxybenzoic acid, 2-ethoxybenzoic acid, 3-ethoxybenzoic acid, 4-ethoxybenzoic acid, 2,3-diethoxybenzoic acid, 2,4-diethoxybenzoic acid, 2,5-diethoxybenzoic acid, 3,5-diethoxybenzoic acid, phenoxyacetic acid, (2-methylphenoxy)acetic acid, (3-methylphenoxy)acetic acid, (4-methylphenoxy)acetic acid, 2-phenoxypropanoic acid, 2-phenoxybutyric acid, naphthalene-1-carboxylic acid, naphthalene-2-carboxylic acid and 2-(naphthalen-1-yl)acetic acid.

Preferably as the second monomer B one or more are selected from the group consisting of benzoic acid, 2-methylbenzoic acid, 3-methylbenzoic acid, 4-methylbenzoic, 2-methoxybenzoic acid, 3-methoxybenzoic acid and 4-methoxybenzoic acid.

Third Monomer C

As the third monomer C, a monomer may be used that is able to form an ester linkage with an alcohol or an amide linkage with a primary or secondary amine. The third monomer C may be, for example a dicarboxylic acid, an anhydride of a dicarboxylic acid, a lactone or a hydroxycarboxylic acid.

A function of the third monomer C may be to serve as a spacer in the copolymer. The spacer may be provided to interconnect the different parts of the copolymer on the one hand and to space the different parts of the copolymer on the other hand. Moreover, by applying a spacer in the copolymer, the molecular weight of the copolymer may be suitably controlled. Furthermore, by suitably selecting the spacer used in the copolymer, the properties of the copolymer may be tuned. For example, the glass transition temperature ($T_g$) and the viscosity of the copolymer may be controlled by suitably selecting the third monomer C. In addition, the distance between the two different functional groups, used to form linkages between the different types of monomer in the copolymer, may be controlled by controlling the nature of the spacer. The spacer may be selected, for example based on its polarity, its rigidity, its molecular weight, etc.

The third monomer C may form at least one ester linkage and/or a amide linkage with the first monomer A. For example, in case the third monomer C comprises a carboxylic acid functional group, a condensation reaction may take place between the carboxylic acid functional group and one of the hydroxyl functional groups and/or a hydrogen atom bonded to the primary or secondary amine group present in the first monomer A, thereby forming an ester linkage and/or an amide linkage between the first and the third monomer. The third monomer may comprise a second functional group, being able to form a second linkage, such as an ester linkage between the spacer and one of the groups selected from the groups present in the first monomer A, the second monomer B, the third monomer C and optionally a fourth monomer D. The second functional group of the third monomer C may also form an amide linkage with the optional primary or secondary amine group present in the first monomer A. Alternatively, the second functional group may be present in the third monomer after coupling of the third monomer C to the first monomer A. For example, in case the third monomer C is an anhydride of a dicarboxylic acid or a lactone, the functional group is part of a ring structure. The ring structure needs to be opened, for example during a coupling of the third monomer C comprising the ring to the first monomer A, before the second functional group is able to form a second linkage to any of the other monomers present. The spacer may connect two first monomers, thereby interconnecting two backbone moieties of the copolymer. Depending on the desired molecular weight of the copolymer, a plurality of spacer may be used to interconnect the backbone moieties of the copolymer. The backbone moieties are formed by the first monomer A, which is a polyhydroxyl alcohol optionally comprising a primary or secondary amine functionality. For interconnecting two polyhydroxyl alcohols, spacers are required that are able to form at least two linkages with the polyhydroxyl alcohol. Dicarboxylic acids, or anhydrides of dicarboxylic acids are able to form two ester linkages with compounds comprising a hydroxyl functional group; i.e. a dicarboxylic acid and two hydroxyl functional group containing compounds may be bonded to one another, thereby forming two ester linkages. Alternatively one of the carboxylic acid groups of the third monomer C may be bonded to the primary or secondary amine group which is optionally comprised in the first monomer A to form a primary or secondary amide linkage respectively.

However, the spacer may also be used to interconnect the backbone to an end-group, formed by the third monomer C or the fourth monomer D. The backbone may comprise a plurality of hydroxyl functional groups. The end-groups may comprise a carboxylic acid functional group. Thus, the dicarboxylic acids or the anhydrides of the dicarboxylic acids mentioned above may not be suited to couple the hydroxyl functional group of the backbone to the carboxylic acid functional group of the end-group. Instead, a spacer may be needed that is able to form a linkage with the hydroxyl functional group of the backbone on the one hand and with the carboxylic acid functional group of the end-group on the other hand. Hydroxyl-carboxylic acids and lactones are therefore suitable spacers. A hydroxyl-carboxylic acid is a compound that comprises both a hydroxyl functional group and a carboxylic acid functional group. The carboxylic acid functional group may form an ester linkage with one of the hydroxyl functional groups or primary or secondary amine groups of the backbone; the hydroxyl functional group of the hydroxyl-carboxylic acid compound may form an ester linkage with the carboxylic acid functional group of the end-group. Optionally, more than one spacer may space the backbone and the end-group. The hydroxyl-carboxylic acid components as mentioned above, may comprise both a hydroxyl functional group and a carboxylic acid functional group. The hydroxyl functional group of a spacer may form an ester linkage with a carboxylic acid functional group of another spacer, and as a consequence, the backbone and the end-group may be spaced by a chain of spacers.

Preferably the third monomer C is selected from, but not limited to: phthalic acid, 2-benzofuran-1,3-dione, isophthalic acid, terephthalic acid, hexahydro-2-benzofuran-1,3-dione, cyclohexane-1,2-dicarboxylic acid, cyclohexane-1,3-dicarboxylic acid, cyclohexane-1,4-dicarboxylic acid, dihydrofuran-2,5-dione, oxepane-2,7-dione, dihydro-2H-pyran-2,6 (3H)-dione, malonic acid, 2-methylmalonic acid, 2-ethylmalonic acid, 2,2-dimethylmalonic acid, 2,2-diethylmalonic acid, 2,2-methylethylmalonic acid, succinic acid, 2-methylsuccinic acid, 2-ethylsuccinic acid, 2-phenylsuccininc acid, 2,3-dimethylsuccinic acid, 2,3-diethylsuccinic acid, 2,3-methylethylsuccininc acid, glutaric acid, 2-methylglutaric acid, 3-methylglutaric acid, 2,3-dimethylglutaric acid, 2,4-dimethylglutaric acid, 2,3,4-trimethylglutaric acid, 2,2-dimethylglutaric acid, 3,3-dimethylglutaric acid, 2-ethylglutaric acid, 3-ethylglutaric acid, 2,3-diethylglutaric acid, 2,4-diethylglutaric acid, 2,3,4-triethylglutaric acid, 2,2-diethylglutaric acid, 3,3-diethylglutaric acid, 2-phenylglutaric acid, 3-phenylglutaric acid, adipic acid, 2-methyl adipic acid, 3-methyl adipic acid, 2,2-dimethyl adipic acid, 2,3-dimethyl adipic acid, 2,4-dimethyl adipic acid, 2,5-dimethyladipic acid, 3,3-dimethyl adipic acid, 3,4-dimethyl adipic acid, 2-ethyl adipic acid, 3-ethyl adipic acid, 2,2-diethyl adipic acid, 2,3-diethyl adipic acid, 2,4-diethyl adipic acid, 2,5-diethyladipic acid, 3,3-diethyladipic acid, 3,4-diethyl adipic acid, 2,2-ethylmethyl adipic acid, 2-ethyl-3-methyl adipic acid, 3-methyl-2-ethyl adipic acid, 2-phenyl adipic acid, 3-phenyl adipic acid, pimelic acid, 2-methyl pimelic acid, 3-methyl pimelic acid, 4-methyl pimelic acid, 2,2-dimethyl pimelic acid, 2,3-dimethyl pimelic acid, 2,4-dimethylpimelic acid, 2,5-dimethyl pimelic acid, 2,6-dimethyl pimelic acid, 3,3-dimethylpimelic acid, 3,4-dimethylpimelic acid, 3,5-dimethylpimelic acid, 4,4-dimethyl pimelic acid, 2-ethyl pimelic acid, 3-ethyl pimelic acid, 4-ethyl pimelic acid, 2,2-diethyl pimelic acid, 2,3-diethyl pimelic acid, 2,4-diethylpimelic acid, 2,5-diethyl pimelic acid, 2,6-diethyl pimelic acid, 3,3-diethylpimelic acid, 3,4-diethylpimelic acid, 3,5-diethylpimelic acid, 4,4-diethyl pimelic acid, 2,2-ethylmethylpimelic acid, 2-methyl-3-ethyl pimelic acid, 3-methyl-2-ethyl pimelic acid, 2-methyl-4-ethyl pimelic acid, 4-methyl-2-ethyl pimelic acid, 2-phenyl pimelic acid, 3-phenyl pimelic acid, 4-phenyl pimelic acid, suberic acid, 2-methyl suberic acid, 3-methyl suberic acid, 4-methyl suberic acid, 2-ethyl suberic acid, 2,2-dimethyl suberic acid, 2,3-dimethyl suberic acid, 2,4-dimethylsuberic acid, 2,5-dimethyl suberic acid, 2,6-dimethyl suberic acid, 2,7-dimethylsuberic acid, 3,4-dimethyl suberic acid, 3,5-dimethyl suberic acid, 3,6-dimethyl suberic acid, 4,5-dimethyl suberic acid, 3-ethyl suberic acid, 4-ethyl suberic acid, 2-phenyl suberic acid, 3-phenyl suberic acid, 4-phenyl suberic acid, 2,2-diethyl suberic acid, 2,3-diethyl suberic acid, 2,4-diethyl suberic acid, 2,5-diethyl suberic acid, 2,6-diethyl suberic acid, 2,7-diethylsuberic acid, 3,4-diethyl suberic acid, 3,5-diethyl suberic acid, 3,6-diethyl suberic acid, 4,5-diethyl suberic acid, 2-phenyl suberic acid, 3-phenyl suberic acid, 4-phenyl suberic acid, 2,2-methylethyl suberic acid, 2,2-methylphenyl suberic acid, 2,2-ethylphenyl suberic acid, 2-methyl-3 ethyl suberic acid, 2-methyl-3-ethyl suberic acid, 2-methyl-3-phenyl suberic acid, 3-methyl-2-phenyl suberic acid, 3-ethyl-2-phenyl suberic acid, 2-ethyl-3-phenyl suberic acid, azelaic acid, 2-methyl azelaic acid, 3-methyl azelaic acid, 4-methyl azelaic acid, 5-methyl azelaic acid, 2,2-dimethyl azelaic acid, 2,3-dimethyl azelaic acid, 2,4-dimethyl azelaic acid, 2,5-dimethyl azelaic acid, 2,6-dimethyl azelaic acid, 2,7-dimethyl azelaic acid, 2,8-dimethyl azelaic acid, 3,3-dimethyl azelaic acid, 3,4-dimethyl azelaic acid, 3,5-dimethyl azelaic acid, 3,6-dimethyl azelaic acid, 3,7-dimethyl azelaic acid, 4,4-dimethyl azelaic acid, 4,5-dimethyl azelaic acid, 4,6-dimethyl azelaic acid, 5,5-dimethyl azelaic acid, 2-ethyl azelaic acid, 3-ethyl azelaic acid, 4-ethyl azelaic acid, 5-ethyl azelaic acid, 2,2-diethyl azelaic acid, 2,3-diethyl azelaic acid, 2,4-diethyl azelaic acid, 2,5-diethyl azelaic acid, 2,6-diethyl azelaic acid, 2,7-diethyl azelaic acid, 2,8-diethyl azelaic acid, 3,3-diethyl azelaic acid, 3,4-diethyl azelaic acid, 3,5-diethyl azelaic acid, 3,6-diethyl azelaic acid, 3,7-diethyl azelaic acid, 4,4-diethyl azelaic acid, 4,5-diethyl azelaic acid, 4,6-diethyl azelaic acid, 5,5-diethyl azelaic acid, 2-phenyl azelaic acid, 3-phenyl azelaic acid, 4-phenyl azelaic acid, 5-phenyl azelaic acid, sebacic acid, 2-methyl sebacic acid, 3-methyl sebacic acid, 4-methyl sebacic acid, 5-methyl sebacic acid, 6-methyl sebacic acid, 2,2-dimethyl sebacic acid, 2,3-dimethyl sebacic acid, 2,4-dimethyl sebacic acid, 2,5-dimethyl sebacic acid, 2,6-dimethyl sebacic acid, 2,7-dimethyl sebacic acid, 2,8-dimethyl sebacic acid, 2,9-dimethyl sebacic acid, 2,10-dimethyl sebacic acid, 2,11-dimethyl sebacic acid, 3,3-dimethyl sebacic acid, 3,4-dimethyl sebacic acid, 3,5-dimethyl sebacic acid, 3,6-dimethyl sebacic acid, 3,7-dimethyl sebacic acid, 3,8-dimethyl sebacic acid, 3,9-dimethyl sebacic acid, 3,10-dimethyl sebacic acid, 4,4-dimethyl sebacic acid, 4,5-dimethyl sebacic acid, 4,6-dimethyl sebacic acid, 4,7-dimethyl sebacic acid, 4,8-dimethyl sebacic acid, 4,9-dimethyl sebacic acid, 5,5-dimethyl sebacic acid, 5,6-dimethyl sebacic acid, 5,7-dimethyl sebacic acid, 5,8-dimethyl sebacic acid, 6,6-dimethyl sebacic acid, 6,7-dimethyl sebacic acid, 2-ethyl sebacic acid, 3-ethyl sebacic acid, 4-ethyl sebacic acid, 5-ethyl sebacic acid, 6-ethyl sebacic acid, 2,2-diethyl sebacic acid, 2,3-diethyl sebacic acid, 2,4-diethyl sebacic acid, 2,5-diethyl sebacic acid, 2,6-diethyl sebacic acid, 2,7-diethyl sebacic acid, 2,8-diethyl sebacic acid, 2,9-diethyl sebacic acid, 2,10-diethyl sebacic acid, 2,11-diethyl sebacic acid, 3,3-diethyl sebacic acid, 3,4-diethyl sebacic acid, 3,5-diethyl sebacic acid, 3,6-diethyl sebacic acid, 3,7-diethyl sebacic acid, 3,8-diethyl sebacic acid, 3,9-diethyl sebacic acid, 3,10-diethyl sebacic acid, 4,4-diethyl sebacic acid, 4,5-diethyl sebacic acid, 4,6-diethyl sebacic acid, 4,7-diethyl sebacic acid, 4,8-diethyl sebacic acid, 4,9-diethyl sebacic acid, 5,5-diethyl sebacic acid, 5,6-diethyl sebacic acid, 5,7-diethyl sebacic acid, 5,8-diethyl sebacic acid, 6,6-diethyl sebacic acid, 6,7-diethyl sebacic acid, 2-phenyl sebacic acid, 3-phenyl sebacic acid, 4-phenyl sebacic acid, 5-phenyl sebacic acid, 6-phenyl sebacic acid, 2,2-diphenyl sebacic acid, 2,3-diphenyl sebacic acid, 2,4-diphenyl sebacic acid, 2,5-diphenyl sebacic acid, 2,6-diphenyl sebacic acid, 2,7-diphenyl sebacic acid, 2,8-diphenyl sebacic acid, 2,9-diphenyl sebacic acid, 2,10-diphenyl sebacic acid, 2,11-diphenyl sebacic acid, 3,3-diphenyl sebacic acid, 3,4-diphenyl sebacic acid, 3,5-diphenyl sebacic acid, 3,6-diphenyl sebacic acid, 3,7-diphenyl sebacic acid, 3,8-diphenyl sebacic acid, 3,9-diphenyl sebacic acid, 3,10-diphenyl sebacic acid, 4,4-diphenyl sebacic acid, 4,5-diphenyl sebacic acid, 4,6-diphenyl sebacic acid, 4,7-diphenyl sebacic acid, 4,8-diphenyl sebacic acid, 4,9-diphenyl sebacic acid, 5,5-diphenyl sebacic acid, 5,6-diphenyl sebacic acid, 5,7-diphenyl sebacic acid, 5,8-diphenyl sebacic acid, 6,6-diphenyl sebacic acid, 6,7-diphenyl sebacic acid, 3-methyl-10-ethyl sebacic acid, 3-ethyl-10-methyl sebacic acid, 3-methyl-10-phenyl sebacic acid, 3-phenyl-10-ethyl sebacic acid, 3-ethyl-10-phenyl sebacic acid, 3-phenyl-10-ethyl sebacic acid, 1,9-nonanedicarboxylic acid, and derivatives thereof, such as alkyl-derivatives or aryl-derivatives, 1,10-decanedicarboxylic acid and derivatives thereof, such as alkyl-derivatives or aryl-derivatives, anhydrides of the above mentioned carboxylic acids, such as, but not limited to succinic anhydride, maleic anhydride, phthalic anhydride, acetic anhydride, cantharidin, malonic anhydride, glutaric anhydride and adipic anhydride. Alternatively, the third monomer C may be selected from a hydroxyl carboxylic acid, such as lactic acid, 3-hydroxypropanoic acid, 2-hydroxybutanoic acid, 3-hydroxybutanoic acid, 4-hydroxybutanoic acid, 2-hydroxypentanoic acid, 3-hydroxypentanoic acid, 4-hydroxy valeric acid, 5-hydroxy valeric acid, 2-hydroxyisocaproic acid, 2-hydroxy hexanoic acid, 3-hydroxy hexanoic acid, 4-hydroxy hexanoic acid, 5-hydroxy hexanoic acid, 6-hydroxy hexanoic acid, 2-hydroxy heptanoic acid, 3-hydroxy heptanoic acid, 4-hydroxy heptanoic acid, 5-hydroxy heptanoic acid, 6-hydroxy heptanoic acid, 7-hydroxy heptanoic acid, 2-hydroxy octanoic acid, 3-hydroxy octanoic acid, 4-hydroxy octanoic acid, 5-hydroxy octanoic acid, 6-hydroxy octanoic acid, 7-hydroxy octanoic acid, 8-hydroxy octanoic acid, and derivatives thereof, for example alkyl derivatives thereof or aryl derivatives thereof, or lactones, such as α-acetolactone, β-propiolactone, γ-butyrolactone, and δ-valerolactone, ε-caprolactone, and derivatives thereof, for example alkyl derivatives thereof or aryl derivatives thereof.

In an embodiment, the copolymer is a copolymer from at least a first monomer A, said first monomer A being a polyhydroxyl alcohol comprising X hydroxyl functional groups, wherein X≥4, or wherein X≥3 and monomer A further comprises a primary of secondary amine functionality, a second monomer B, said second monomer B being an aromatic monocarboxylic acid, a third monomer C being able to form an ester linkage with an alcohol and/or an amide linkage with a primary or secondary amine, and a fourth monomer D, being an aromatic monocarboxylic acid different from B. The fourth monomer D is selected from the same group as the second monomer B.

In an embodiment, the amorphous resin is a reaction product of a diol and a monocarboxylic acid, preferably the amorphous resin is a reaction product of a di-alkanolamine and an aromatic monocarboxylic acid, more preferably the amorphous resin is a reaction product of diisopropanol amine and benzoic acid.

Examples of amorphous resins according to this embodiment are shown in Table 3.

TABLE 3

Reaction products of di-isopropanolamine and aromatic acids.

| No | Reaction product of: | Tg [° C.] | Viscosity [mPa · s] (measuring temperature in ° C.) | | |
|---|---|---|---|---|---|
| 1 | di-isopropanolamine (1 part) and benzoic acid (3 parts) | 7 | 37 (110) | 16 (130) | 8 (150) |
| 2 | di-isopropanolamine (1 part) and 2-methylbenzoic acid (3 parts) | 3 | 37 (110) | 16 (130) | 9 (150) |
| 3 | di-isopropanolamine (2 parts) and 2-methylbenzoic acid (3 parts) 4-t-butylbenzoic acid (3 parts) | 14 | 127 (110) | 39 (130) | 17 (150) |
| 4 | di-isopropanolamine (1 part) and 4-methoxybenzoic acid (3 parts) | 23 | 91 (120) | 34 (140) | 16 (160) |

TABLE 3-continued

Reaction products of di-isopropanolamine and aromatic acids.

| No | Reaction product of: | Tg [° C.] | Viscosity [mPa · s] (measuring temperature in ° C.) | | |
|---|---|---|---|---|---|
| 5 | di-isopropanolamine (1 part) and 4-methylbenzoic acid (3 parts) | 19 | 40 (120) | 17 (140) | 9 (160) |

Table 3 shows a number of reaction products of di-isopropanolamine and aromatic acids. The first product is formed by reaction of one part of di-isopropanolamine and three parts of benzoic acid. The second product is formed by reaction of one part of di-isopropanolamine and three parts of 2-methylbenzoic acid. The third product is formed by reaction of two parts of di-isopropanolamine, three parts of 2-methylbenzoic acid and three parts 4-t-butylbenzoic acid. The fourth product is formed by reaction of one part of di-isopropanolamine and three parts 4-methoxybenzoic acid. The fifth and last product in this Table is formed by reaction of one part of di-isopropanolamine and three parts 4-methylbenzoic acid.

The second column of Table 3 shows the glass transition temperatures of the respective compounds. These are measured using a Differential Scanning calorimeter (DSC), namely the DSC-7 made by Perkin Elmer, Norwalk, Conn. The glass transition temperature of a resin in this test is equated with the onset of the bending point of the enthalpy increase corresponding to the glass transition as measured in the heating of a resin at 20° C./min. To know the thermal history of a resin, each resin is heated once, prior to measurement, to above its glass transition temperature (20° C./min) and then rapidly cooled to room temperature ("quenching").

Finally, Table 3 shows for each of the compounds the viscosity at three measurement temperatures. This viscosity is measured using a steady shear viscosimeter, namely the DSR-200 made by Rheometric Scientific, Piscataway, N.Y., using the known plate-cone geometry. The viscosity follows from the ratio between the stress required to shear the resin and the shearing speed in equilibrium.

The reaction products given in this Table are monomeric distinct compounds. They can be used as resins in a hotmelt composition, alone or in mixture with one or more other resins. These amorphous compounds have a relatively low viscosity at typical jet temperatures of 130-160° C. and are thermally stable. The compounds solidify amorphously and their amorphous state is very stable. Even after a long time and under extreme conditions (for example storage above the glass transition temperature) there is practically no perceptible post-crystallization, if any.

In an embodiment, the amorphous resin is a reaction product of a diol, a diacid or anhydride thereof and a monocarboxylic acid, preferably the amorphous resin is a reaction product of a di-alkanolamine, a diacid or anhydride thereof and an aromatic monocarboxylic acid, more preferably the amorphous resin is a reaction product of diisopropanol amine, succinic acid or its anhydride and benzoic acid.

An example of an amorphous resin according to this embodiment is described in experiment 2 and shown in FIG. 4. This product is not a distinct compound but a mixture of monomeric and oligomeric compounds in accordance with formula 1 (n=0, n=1, n=2, and so on), this being the notation for the most probable molecule structure of the resulting compounds. Despite its fairly high molecular weight, this mixture nevertheless has a relatively low viscosity at the typical jet temperatures.

In an embodiment, the viscosity q of the copolymer at a temperature of 150° C. is in the range of 10 mPa·s to 1000 mPa·s. Preferably, the viscosity of the copolymer is in the range of 12 mPa·s to 400 mPa·s. More preferably, the viscosity of the copolymer is in the range of 15 mPa·s to 300 mPa·s.

In an embodiment, the weight averaged molecular weight ($M_w$) of the copolymer is less than 4000 gram/mole. Preferably, the $M_w$ of the copolymer is in the range of 500-3800 gram/mole. More preferably, the $M_w$ of the copolymer is in the range of 1000-3600 gram/mole. Even more preferably, the $M_w$ of the copolymer is in the range of 1500-3200 gram/mole. Generally, the molecular weight, or the weight averaged molecular weight of a compound influences the viscosity of the compound; the higher the molecular weight (or $M_w$), the higher the viscosity q of the compound. In addition, the molecular weight may also influence the $T_g$ of the copolymer.

In an embodiment, the hotmelt composition used as a sacrificial layer according to the present invention comprises the amorphous resin in an amount of between 20 wt % and 100 wt %, preferably between 30 wt % and 95 wt %, more preferably between 40 wt % and 90 wt %, even more preferably between 50 wt % and 85 wt %, relative to the total hotmelt composition.

Crystalline Material

In an embodiment, the hotmelt composition comprises a crystalline material in an amount of between 0 wt % and 70 wt %, preferably between 5 wt % and 60 wt %, more preferably between 10 wt % and 50 wt %, more preferably between 15 wt % and 40 wt %, relative to the total hotmelt composition.

The crystalline material used in the present embodiment is not limited to a certain kind but may be suitably selected from the group consisting of the compounds shown in Table 4.

TABLE 4

Selection of crystalline materials

| Formula No. (abbreviation) | | Tm (° C.) | Tc (° C.) |
|---|---|---|---|
| I | R—O—C(=O)—NH—(CH$_2$)$_6$—NH—C(=O)—O—R | | |
| 1 | R = CH$_3$O—CH$_2$—CH$_2$— (HMDI-MEG) | 77 | 48 |
| 2 | R = C$_2$H$_5$O—CH$_2$—CH$_2$— (HMDI-EEG) | 73 | 48 |

TABLE 4-continued

Selection of crystalline materials

| Formula No. (abbreviation) | Tm (° C.) | Tc (° C.) |
|---|---|---|
| 3 R = C$_6$H$_{13}$— (HMDI-HA) | 100 | 84 |
| 4 R = C$_6$H$_5$—CH$_2$—CH$_2$— (HMDI-PEA) | 132 | 98 |

II 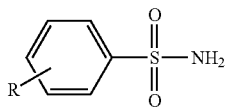

| | | |
|---|---|---|
| 5 R = para CH$_3$— (p-TSA) | 142 | 108 |
| 6 R = ortho/para (40/60) CH$_3$— (o/p-TSA) | 113 | 70 |
| 7 R = para C$_2$H$_5$— (p-EBSA) | 112 | 86 |
| 8 p-TSA/p-EBSA 1:1 | 108 | 83 |
| 9 R = para n-C$_4$H$_9$— (p-BuBSA) | 101 | 64 |
| III Alcohols | | |
| 10 1,2-hexadecanediol (1,2-HDD) | 74 | 56 |
| 11 1,12-dodecanediol (1,12-DDD) | 87 | 70 |
| 12 4-biphenylmethanol (4-BPM) | 104 | 88 |
| 13 1,4 hydrochinon bis (2-hydroxyethyl) ether (HQHE) | 109 | 84 |
| 14 1,4 benzenedimethanol (1,4 BDM) | 123 | 81 |
| 15 1-O-p-anisylglycerol (ANGLY) | 82 | 60 |
| 16 phenyl 1,2-ethaandiol (PED) | 68 | 17 |
| IV Various | | |

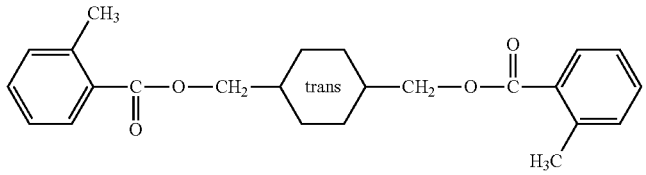

| | | |
|---|---|---|
| 17 trans-cyclo-hexane-1,4-dimethanol di-2-toluate (CYCLO-2T) | 97 | 62 |

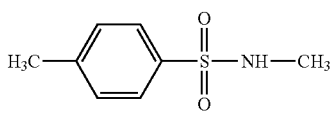

| | | |
|---|---|---|
| 18 N-methyl-para-toluenesulfonamid (N-PTSA) | 81 | 15 |

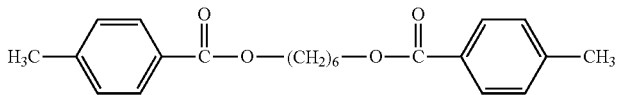

| | | |
|---|---|---|
| 19 1,6-hexanediol-di-4-toluate (1,6-4T) | 92 | 35 |

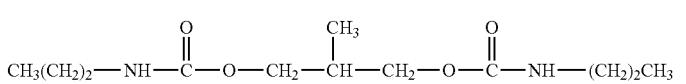

TABLE 4-continued

Selection of crystalline materials

| Formula No. | (abbreviation) | Tm (° C.) | Tc (° C.) |
|---|---|---|---|
| 20 | urethane of 2-methyl-1,3 propanediol and n-propylisocyanate (2M-1,3PI) | 103 | 69 |
| 21 | 1,4-diphenoxybutane (1,4-DPB) | 100 | 84 |

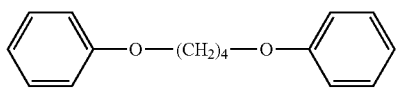

Table 4 shows a selection of crystalline materials which can be used in a hotmelt composition according to the invention. Part I of Table 4 gives a number of crystalline bis-urethanes, in this case the reaction products of hexamethylene diisocyanate (HMDI) and respectively methyl ethylene glycol (MEG), ethyl ethylene glycol (EEG), hexanol (HA) and phenyl ethyl alcohol (PEA). Part II of Table 4 gives a number of sulphonamides, namely, para-toluene sulphonamide, a 40/60 mixture of ortho and para-toluene sulphonamide, para-ethyl benzene sulphonamide and a mixture of para-toluene sulphonamide and para-ethyl benzene sulphonamide and para-n-butyl benzene sulphonamide. Part III of Table 4 gives data on a number of (di)-alcohols. Other compounds suitable for use in an ink composition according to the invention are shown in part IV of Table 4.

In an embodiment, the hotmelt composition as used in the present invention comprises a crystalline compound suitably selected from Table 5. Compounds 1-9 represent examples of high melting crystalline compounds, compounds 10-12 represent low melting crystalline components.

TABLE 5

Examples of crystalline components

| Compound no. | Molecular structure |
|---|---|
| 1 | 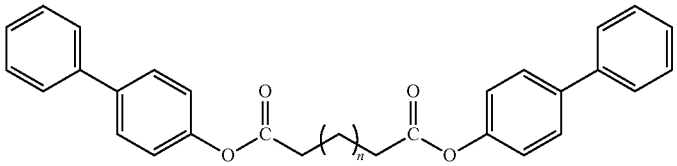 $n = 4, 5, 6, 7, 8$ or $9$ |
| 2 | 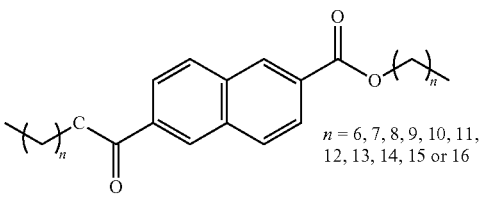 $n = 6, 7, 8, 9, 10, 11, 12, 13, 14, 15$ or $16$ |
| 3 | 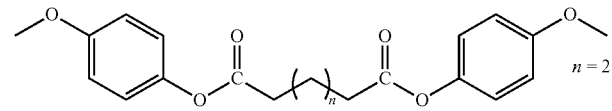 $n = 2, 3$ or $4$ |
| 4 | 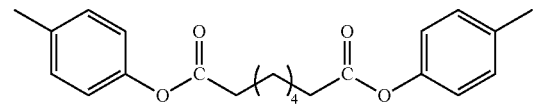 |
| 5 | 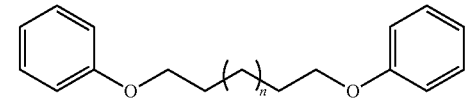 $n = 1, 2, 3, 4, 5$ or $6$ |

TABLE 5-continued
Examples of crystalline components
| Compound no. | Molecular structure |
|---|---|
| 6 | 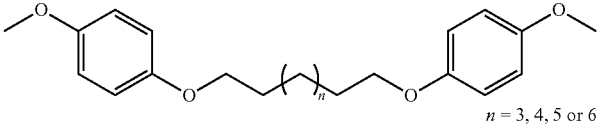 $n = 3, 4, 5$ or $6$ |
| 7 | 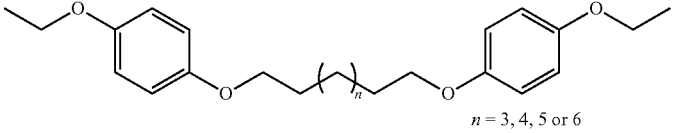 $n = 3, 4, 5$ or $6$ |
| 8 | 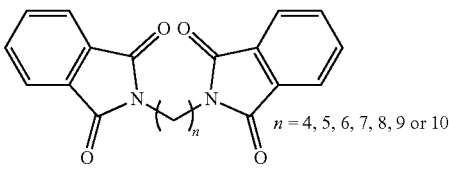 $n = 4, 5, 6, 7, 8, 9$ or $10$ |
| 9 | 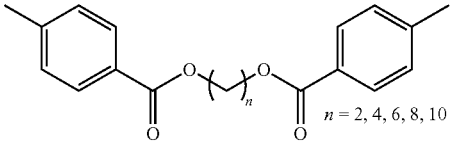 $n = 2, 4, 6, 8, 10$ |
| 10 | 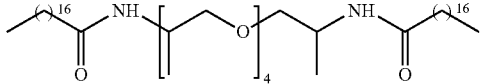 |
| 11 | 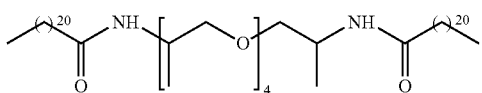 |
| 12 | 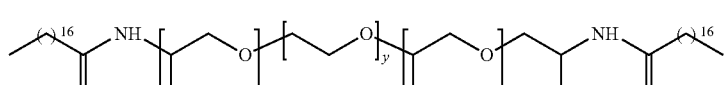 $9 \leq x + y + z \leq 11$ |

In an embodiment, the hotmelt composition as used in the present invention comprises a crystalline compound satisfying the general formula below:

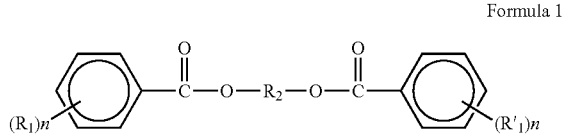

Formula 1 wherein $R_1$ and $R'_1$ are the same or different and are selected from a C1-8 alkyl or C1-8 alkoxy, $R_2$ is a C1-12 linear alkane diyl or a C5-12 alkane diyl which contains an alicyclic group, and n is equal to 1, 2, or 3. These bis-ester compounds have melting temperatures suitable for forming a hotmelt composition. The melt viscosity of the compounds is also sufficiently low, typically lower than 20 cP, at the regular jet temperatures. The compounds also so set that they can result in hotmelt compositions (and hence sacrificial layers) sufficiently resistant to mechanical stresses. Finally, these compounds are stable in the solidified state, so that the risk of deterioration of quality of images printed onto a sacrificial layer comprising a hotmelt composition comprising such compounds may be reduced.

Specific examples of such crystalline compounds are given in Table 6

TABLE 6

Formula 1 compounds and their melting point

| No | Structural formula | Tm [° C.] |
|---|---|---|
| 1 | 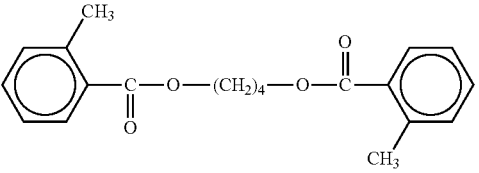 | 69 |
| 2 | 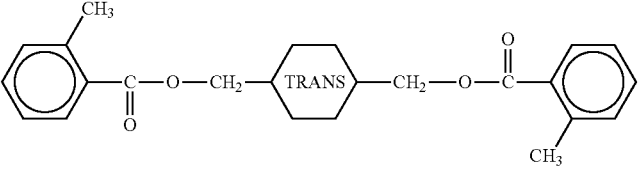 | 96 |
| 3 | 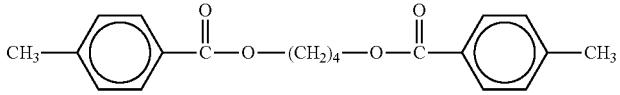 | 117 |
| 4 | 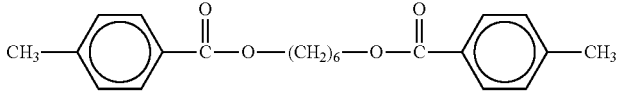 | 90 |
| 5 | 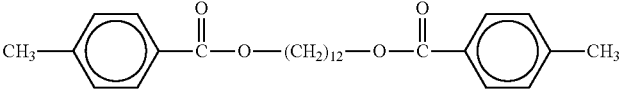 | 60 |
| 6 | 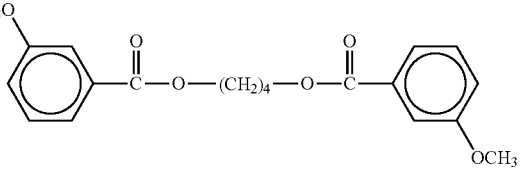 | 78 |
| 7 | 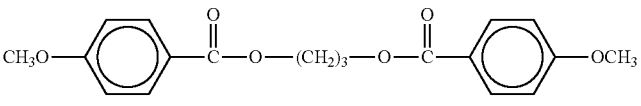 | 107 |
| 8 | 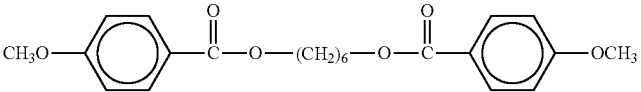 | 95 |

TABLE 6-continued

Formula 1 compounds and their melting point

| No | Structural formula | Tm [° C.] |
|---|---|---|
| 9 | $CH_3O\text{-}\bigcirc\text{-}C(=O)\text{-}O\text{-}(CH_2)_8\text{-}O\text{-}C(=O)\text{-}\bigcirc\text{-}OCH_3$ | 88 |
| 10 | $C_3H_7\text{-}O\text{-}\bigcirc\text{-}C(=O)\text{-}O\text{-}(CH_2)_4\text{-}O\text{-}C(=O)\text{-}\bigcirc\text{-}O\text{-}C_3H_7$ | 95 |
| 11 | 3,4-dimethoxy-$\bigcirc\text{-}C(=O)\text{-}O\text{-}(CH_2)_6\text{-}O\text{-}C(=O)\text{-}\bigcirc\text{-}$3,4-dimethoxy | 115 |
| 12 | 3,4,5-trimethoxy-$\bigcirc\text{-}C(=O)\text{-}O\text{-}(CH_2)_2\text{-}O\text{-}C(=O)\text{-}\bigcirc\text{-}$3,4,5-trimethoxy | 114 |
| 13 | 4-tert-butyl-$\bigcirc\text{-}C(=O)\text{-}O\text{-}(CH_2)_4\text{-}O\text{-}C(=O)\text{-}\bigcirc\text{-}$4-tert-butyl | 82 |

The structural formula and the melting point are given for each compound in Table 6. The melting points were determined by differential scanning calorimetry (DSC-7 made by Perkin-Elmer). For this purpose, each of the compounds was heated from −20° C. to 150° C. at a heating rate of 20° C./min. The melting temperature was the position of the top of the melting peak (endothermic process).

The compounds 1 and 2 are the bis-esters of 2-methyl benzoic acid and 1,4-butane diol, and trans-1,4-cyclohexane dimethanol respectively.

The compounds 3, 4 and 5 are the bis-esters of 4-methyl benzoic acid and 1,4-butane diol, and 1,6-hexane diol and 1,12-dodecane diol respectively.

Compound 6 is the bis-esters of 3-methoxy benzoic acid and 1,4-butane diol.

Compounds 7, 8 and 9 are the bis-esters of 4-methoxy benzoic acid and 1,3-propane diol, and 1,6-hexane diol and 1,8-octane diol respectively.

Compound 10 is the bis-ester of 4-n-propoxy benzoic acid and 1,4-butane diol.

Compound 11 is the bis-ester of 3,4-dimethoxy benzoic acid and 1,6-hexane diol.

Compound 12 is the bis-ester of 3,4,5-trimethoxy benzoic acid and 1,2-ethane diol.

Compound 13 finally is the bis-ester of 4-tertbutyl-benzoic acid and 1,4-butane diol.

Alternatively, similar compounds as shown in Table 6 may be obtained by reacting a corresponding dicarboxylic acid with a corresponding mono-alcohol, e.g. a bis-ester of 2-methyl-phenol and adipic acid, which is similar to compound 1 of Table 6 (reversed ester bonds).

Gelling Agent

In an embodiment, the hotmelt composition comprises a gelling agent in an amount of between 0 wt % and 10 wt %, preferably between 0.5 wt % and 8 wt %, more preferably between 1 wt % and 6 wt %, more preferably between 1.5 wt % and 4 wt %, relative to the total hotmelt composition.

The gelling agent used in the present embodiment is not limited to a certain kind but may be suitably selected from the group consisting of the compounds shown in Table 7.

TABLE 7

Gelling agent selection

| Agent (type) | Structural formula | Tm (° C.) | Tc (° C.) |
|---|---|---|---|
| gel-1 (mono-ester) | $H_{59}C_{29}\text{-}C(=O)\text{-}O\text{-}C_{28}H_{57}$ | 72 | 60 |

TABLE 7-continued

Gelling agent selection

| Agent (type) | Structural formula | Tm (°C.) | Tc (°C.) |
|---|---|---|---|
| gel-2 (di-ester) | $H_{59}C_{29}-C(=O)-O-(CH_2)_2-O-C(=O)-C_{29}H_{59}$ | 83 | 70 |
| gel-3 (di-ether-alcohol) | biphenyl-$O-CH_2-CH(OH)-CH_2-O-(CH_2)_{17}CH_3$ | 101 | 86 |
| gel-4 (diamide-ether) | $H_3C(CH_2)_3-O-(CH_2)_3-NH-C(=O)-(CH_2)_4-C(=O)-NH-(CH_2)_3-O-(CH_2)_3CH_3$ | 117 | 111 |
| gel-5 (diamide-ether) | $H_3C-O-(CH_2)_3-NH-C(=O)-(CH_2)_{10}-C(=O)-NH-(CH_2)_3-O-CH_3$ | 130 | 126 |
| gel-6 (diamide-ether) | $H_3C(CH_2)_3-O-(CH_2)_3-NH-C(=O)-(CH_2)_{10}-C(=O)-NH-(CH_2)_3-O-(CH_2)_3CH_3$ | 116 | 103 |
| gel-7 (diamide-alcohol) | $HO-(CH_2)_3-NH-C(=O)-(CH_2)_{10}-C(=O)-NH-(CH_2)_3-OH$ | 137 | 124 |
| gel-8 (diamide-alcohol) | $H_3C-CH(OH)-CH_2-NH-C(=O)-(CH_2)_{10}-C(=O)-NH-CH_2-CH(OH)-CH_3$ | 113 | 89 |
| gel-9 (diamide-alcohol) | $HO-(CH_2)_5-C(=O)-NH-(CH_2)_6-NH-C(=O)-(CH_2)_5-OH$ | 135 | 124 |
| gel-10 (diamide-alcohol) | $HO-(CH_2)_5-C(=O)-NH-(CH_2)_{12}-NH-C(=O)-(CH_2)_5-OH$ | 139 | 129 |
| gel-11 (diamide-alcohol) | $HO-(CH_2)_3-C(=O)-NH-(CH_2)_{12}-NH-C(=O)-(CH_2)_3-OH$ | 142 | 131 |
| gel-12 (diamide-alcohol) | $H_3C-CH(OH)-CH_2-C(=O)-NH-(CH_2)_{12}-NH-C(=O)-CH_2-CH(OH)-CH_3$ | 114 | 97 |
| gel-13 (diamide) | 4-methyl-1,2-phenylene bis[NH-C(=O)-(CH_2)_{16}-CH_3] | 108 | 86 |
| gel-14 (di-urethane) | $H_3C(CH_2)_5-O-C(=O)-NH-(CH_2)_6-NH-C(=O)-O-(CH_2)_5CH_3$ | 99 | 89 |
| gel-15 (di-urethane) | $H_3C(CH_2)_{17}-NH-C(=O)-O-(CH_2)_6-O-C(=O)-NH-(CH_2)_{17}CH_3$ | 117 | 101 |
| gel-16 (di-urethane) | $H_3C(CH_2)_{17}-NH-C(=O)-O-(CH_2)_8-O-C(=O)-NH-(CH_2)_{17}CH_3$ | 118 | 105 |
| gel-17 (di-urethane) | $H_3C(CH_2)_{17}-NH-C(=O)-O-(CH_2)_{10}-O-C(=O)-NH-(CH_2)_{17}CH_3$ | 116 | 103 |

TABLE 7-continued

Gelling agent selection

| Agent (type) | Structural formula | Tm (° C.) | Tc (° C.) |
|---|---|---|---|
| gel-18 (di-urethane) | $H_3C(CH_2)_{17}-NH-C(=O)-O-(CH_2)_{12}-O-C(=O)-NH-(CH_2)_{17}CH_3$ | 112 | 100 |
| gel-19 (tri-urethane) | $H_3C(CH_2)_{17}-NH-C(=O)-O-(H_2C)_2-N[(H_2C)_2-O-C(=O)-NH-(CH_2)_{17}CH_3][(CH_2)_2-O-C(=O)-NH-(CH_2)_{17}CH_3]$ | 93 | 64 |
| gel-20 (ureum) | $H_3C(CH_2)_{17}-NH-C(=O)-NH-(CH_2)_{17}CH_3$ | 118 | 60 |
| gel-21 (ureum) | $H_3C(CH_2)_7-NH-C(=O)-NH-(CH_2)_{17}CH_3$ | 100 | 82 |
| gel-22 (di-ureum) | $H_3C(CH_2)_{17}-NH-C(=O)-NH-(CH_2)_{12}-NH-C(=O)-NH-(CH_2)_{17}CH_3$ | 163 | 148 |
| gel-23 (di-ureum) | $H_3C(CH_2)_{17}-NH-C(=O)-NH-(CH_2)_2-O-(CH_2)_2-O-(CH_2)_2-NH-C(=O)-NH-(CH_2)_{17}CH_3$ | 134 | 111 |
| gel-24 (di-ureum) | $H_3C(CH_2)_2-NH-C(=O)-NH-(CH_2)_2-O-(CH_2)_2-O-(CH_2)_2-NH-C(=O)-NH-(CH_2)_2CH_3$ | 132 | 98 |
| gel-25 (di-ureum-siloxane) | $H_3C(CH_2)_{17}-NH-C(=O)-NH-(CH_2)_3-Si(CH_3)_2-O-Si(CH_3)_2-(CH_2)_3-NH-C(=O)-NH-(CH_2)_{17}CH_3$ | 95 | 73 |

Table 7 shows a selection of gelling agents suitable for use in an ink composition according to the invention. The Table starts with practically aliphatic substantially non-polar gelling agents and ends with gelling agents which give rise to strong polar interactions.

Other examples of gelling agents are tetra-esters of pentaerythritol and fatty acids, in particular pentaerythritol tetrastearate Germinating Agent In an embodiment, the hotmelt composition comprises a germinating agent (also termed nucleation agent) in an amount of between 0 wt % and 10 wt %, preferably between 0.5 wt % and 8 wt %, more preferably between 1 wt % and 6 wt %, more preferably between 1.5 wt % and 4 wt %, relative to the total hotmelt composition.

The germinating agent used in the present embodiment is not limited to a certain kind. In many cases the gelling behavior of a hotmelt composition according to the present invention may be based on crystallization of a gelling agent from the hotmelt composition prior to bulk crystallization. The gelling agent generally has a higher crystallization temperature than the crystalline material of the hotmelt composition. Upon cooling of the hotmelt composition, the gelling agent may crystallize prior to the crystalline material present in the hotmelt composition. Therefore, in many cases, compounds suitable as gelling agent are also suitable as germinating agent because upon crystallization of the gelling agent, seeds are created for bulk crystallization (of the crystalline material). Germinating agents may therefore suitably be selected from Table 8. In particular, the reaction product of 3-methoxypropylamide and dodecanedicarboxylic acid (gel-5, Table 7) is used as a germinating agent.

Surfactant

To improve the wetting of the substrate with the molten hotmelt composition and thus to obtain a uniform sacrificial layer, the hotmelt composition may comprise a surfactant. The surfactant may be present in an amount of between 0 wt % and 10 wt %, preferably between 0.25 wt % and 8 wt %, more preferably between 0.5 wt % and 6 wt %, more preferably between 0.75 wt % and 4 wt %, even more preferably between 1 wt % and 2.5 wt % relative to the total hotmelt composition.

The surfactant used in the present embodiment is not limited to a certain kind but may be suitably selected from Byk surfactants, in particular the Byk 300 series, obtainable from Altana AG Colorants In an embodiment, the sacrificial layer may further contain a colorant being a dye or a pigment. The colorant may be a pigment, a mixture of pigments, a dye, a mixture of dyes, a mixture of a dye and a pigment or a mixture of more than one dye and more than one pigment. Pigments are preferred, because of their superior color fastness with respect to dyes.

An advantage of such a sacrificial layer is that colored reusable print media may be obtained by using a colored sacrificial layer. For example a black reusable print medium may be obtained on which an image with for example white ink may be printed. Alternatively, fluorescent colorants may be used as a background color.

The colorant may be present in an amount of between 0 wt % and 10 wt %, preferably between 0.5 wt % and 8 wt %, more preferably between 1 wt % and 6 wt %, more preferably between 1.5 wt % and 4 wt %, relative to the total hotmelt composition.

The colorant used in the present embodiment is not limited to a certain kind and may be suitably selected by the skilled person. Known colorants are for example: Solvent Yellow 146 (Orasol Yellow 4GN); Solvent Blue 67 (Orasol Blue GN); Solvent Black 27 (Telajet Black NS); Acid Red 143 in particular with a triphenylmethylphosphonium (TMP) counter ion (see WO2008/015182).

Other Additives

In an embodiment, the sacrificial layer may contain additives such as flame retardants, UV-absorbents, thermal stabilizers and the like to improve the durability and/or weatherability of the reusable print medium.

The present invention also relates to the use of a, preferably water insoluble, amorphous material having a glass transition temperature of between −10° C. and 55° C., preferably between −5° C. and 50° C., more preferably between 0° C. and 45° C., more preferably between 5° C. and 40° C., even more preferably between 10° C. and 35° C. as a component of a sacrificial layer for a reusable print medium, as described here above.

Substrates

The substrates used in the present invention are not limited to a specific kind.

In an embodiment, the substrate comprises a plastic film material, for example selected from the group consisting of, but not limited to poly ethylene, poly propylene, polyester, poly vinyls (in particular poly vinyl chloride), such as banner vinyl or pressure sensitive vinyl and polycarbonate. The plastic film material may also comprise appropriate copolymers or polymer blends, for example of the above listed materials. The plastic film material may be impermeable. In general, plastic films are flexible substrates. However, by increasing the substrate thickness of the above mentioned materials, rigid plate substrates may be obtained. Alternatively the plastic films according to this embodiment may be laminated onto a rigid substrate.

In an embodiment, the print substrate may be a fabric, for example a woven or non-woven fabric. Besides plastic materials that may be processed into fibers or yarns (e.g. polyamides, poly ethylene, poly propylene and the like), suitable materials for such a fabric also comprise natural materials such as hemp (traditional canvas), cotton, wool and linen (i.e. fabric made of flax). Print media comprising a print substrate according to the present embodiment may find their application in reusable banners.

In an embodiment, the print substrate may be a rigid print substrate, for example selected from acrylics, polycarbonates, rigid polyvinylchloride (PVC), wood, metals and glass. The rigid substrate may be a corrugated rigid substrate, in particular a corrugated plastic substrate, for example as produced by Coroplast. The rigid substrate may also comprise multiple layers of the above stated materials laminated to one another. Print media comprising a rigid substrate may find their application in advertising, such as billboards, for example for use in sports accommodations.

In an embodiment, the print substrate may be a glass window pane, for example for use as a shop window. The window pane may be provided with lettering and logo's (signs) printed thereon with a weather proof marking material (e.g. UV-curable ink) onto a sacrificial layer according to the present invention. Preferably the sacrificial layer is image wise applied in accordance with the desired lettering and logo image. The lettering and logo's may be easily removed with heat, e.g. with hot water.

In an embodiment, the substrate is an object of any shape, for example a bottle. By providing a sacrificial layer to the bottle, a removable label may be directly printed onto the bottle. The labels may be removed by applying heat, in particular by immersing the bottles in a hot water bath, optionally containing surfactants or other cleaning substances. This embodiment enables paperless labeling of packaging material, which may be considered as an environmentally friendly way of labeling.

Both the material and the object to be labeled are not limited to the above example.

Method of Manufacturing a Reusable Print Medium

In another aspect of the present invention there is provided for a method of manufacturing a reusable print medium according to the present invention by applying a sacrificial layer onto a substrate, the method comprising the steps of:

providing the substrate;

providing a liquid coating composition comprising a hotmelt composition, wherein the hotmelt composition comprises an amorphous material which is a resin being a reaction product of a first monomer A, said first monomer A being a polyhydroxyl alcohol comprising X hydroxyl functional groups, wherein X≥2, monomer A optionally comprises a primary or secondary amine functionality; a second monomer B, being an aromatic monocarboxylic acid; a third monomer C, said third monomer C being able to form an ester linkage with an alcohol and/or an amide linkage with a primary or secondary amine; and optionally, a fourth monomer D, being an aromatic monocarboxylic acid different from the second monomer B;

applying the liquid coating composition to at least a part of a surface of the substrate.

In an embodiment, the amorphous material has a glass transition temperature of between −10° C. and 55° C., preferably between −5° C. and 50° C., more preferably between 0° C. and 45° C., more preferably between 5° C. and 40° C., even more preferably between 10° C. and 35° C.

In an embodiment, the hotmelt composition has a viscosity (η) of below 150 mPa·s at 150° C., preferably below 90 mPa·s at 150° C., more preferably between 5 mPa·s and 50 mPa·s at 150° C., even more preferably between 8 mPa·s to 25 mPa·s at 150° C.

In an embodiment, the liquid coating composition may be obtained by heating the coating composition such that the coating composition melts. The liquid coating composition is maintained at an elevated temperature during application of the coating composition to the substrate in order to prevent solidification during application.

In an embodiment, the coating composition further comprises a solvent (besides a hotmelt composition according to the present invention). A suitable solvent may be any solvent in which the hotmelt composition can be solved.

In this embodiment, the coating composition, which may be a solution of a hotmelt composition in a suitable solvent, may be liquid at room temperature. Alternatively the coating composition according to the present embodiment may be slightly heated to lower its viscosity to provide for easier application to the surface of a substrate.

In an embodiment, the method for manufacturing a reusable print medium comprises the additional step of drying the coated print substrate by allowing the solvent to evaporate. The coated substrate may be dried in air at room temperature or at elevated temperature to increase the speed of evaporation of the solvent.

In an embodiment, the coating composition may be applied to at least a part of the surface of the substrate by a coating technique selected from the group consisting of rod coating, spin coating, roller coating, brushing, spraying and printing.

In an embodiment, the coating composition, may be applied to at least part of the surface of the substrate by inkjet printing. An additional advantage of a method according to this embodiment is that the sacrificial layer may be (imagewise) applied only to the regions of the substrate where a toner or ink image is to be printed. Therefore less material is required for the sacrificial layer. An important aspect of the present embodiment is that the coating composition comprising the amorphous material is jettable by a printhead.

When the coating composition is a hotmelt composition comprising an amorphous material is to be jetted by an inkjet printhead, the printing process is termed a hotmelt inkjet printing process. The hotmelt composition may require additives to improve jettability and setting behavior on the substrate. Examples of such additives are crystalline materials, nucleation agents, gelling agents, which are discussed here above. It is known in the art how to prepare a jettable hotmelt composition and how to improve the jettability and setting behavior by adding the above mentioned components to the hotmelt composition according to the present invention. Specific examples of such additives are stated here above.

The amorphous material in accordance with the present invention is one of the components of the hotmelt composition to be jetted onto a substrate to form a sacrificial layer. In particular the amorphous material may be a binder in the hotmelt composition. A hotmelt composition is characterized in that it is solid at room temperature and liquid at elevated temperature. In order to be jetted, the hotmelt composition has to be in a fluid state and consequently, the hotmelt composition is jetted at elevated temperature. For example, the hotmelt composition may be jetted at a temperature from about 90° C. to about 170° C. Preferably, the hotmelt composition may be jetted at a temperature of about 100° C. to about 150° C. It is preferred that a hotmelt composition that is to be jetted has a relatively low viscosity to facilitate the jetting process. Thus, a hotmelt composition preferably has a low viscosity at the elevated temperature, at which the hotmelt ink is jetted. Therefore, it is preferred that the hotmelt composition has a relatively low viscosity at 150° C., for example lower than 150 mPa·s, preferably lower than 90 mPa·s, such as from 5 mPa·s to 50 mPa·s, for example from 8 mPa·s to 25 mPa·s.

When a coating composition comprising a solvent and a hotmelt composition comprising an amorphous resin according to an embodiment of the present invention is to be jetted, the printing process is termed a solvent based ink jet printing process or when the solvent is water, a water based or aqueous ink jet printing process. Again, additives may be added to the coating composition comprising the solvent and the hotmelt composition to improve jettability, for example cosolvents and/or surfactants. It is known in the art how to prepare a jettable solvent based or aqueous composition and how to improve the jettability by adding the above mentioned components to the composition comprising the amorphous resin of the present invention.

In an embodiment, the coating composition according to any one of the previous embodiments comprises a mixture of amorphous materials according to the present invention.

The sacrificial layer which is applied to the print substrate by performing any of the here above described processes may have a melting region starting from a temperature between 30° C. and 180° C., preferably between 45° C. and 150° C., more preferably between 50° C. and 140° C., even more preferably between 60° C. and 135° C.

Coating Composition

In yet another aspect of the present invention there is provided for a coating composition for use in a method according to the present invention, the coating composition comprising a solvent and a hotmelt composition, wherein the hotmelt composition comprises an amorphous material which is a resin being a reaction product of a first monomer A, said first monomer A being a polyhydroxyl alcohol comprising X hydroxyl functional groups, wherein X≥2, monomer A optionally comprises a primary or secondary amine functionality; a second monomer B, being an aromatic monocarboxylic acid; a third monomer C, said third monomer C being able to form an ester linkage with an alcohol and/or an amide linkage with a primary or secondary amine; and optionally, a fourth monomer D, being an aromatic monocarboxylic acid different from the second monomer B.

In an embodiment, the amorphous material has a glass transition temperature of between −10° C. and 55° C., preferably between −5° C. and 50° C., more preferably between 0° C. and 45° C., more preferably between 5° C. and 40° C., even more preferably between 10° C. and 35° C.

In an embodiment, the hotmelt composition has a viscosity (q) of below 150 mPa·s at 150° C., preferably below 90 mPa·s at 150° C., more preferably between 5 mPa·s and 50 mPa·s at 150° C., even more preferably between 8 mPa·s to 25 mPa·s at 150° C.

Preferably such a coating composition comprises between 5 wt % and 60 wt %, more preferably between 10 wt % and 55 wt %, even more preferably between 25 wt % and 50 wt % of the hotmelt composition.

The coating composition may comprise between 40 wt % and 95 wt %, preferably between 45 wt % and 90 wt %, more preferably between 50 wt % and 75 wt % of the solvent.

The amorphous materials suitably used in this embodiment of the present invention are described here above.

The coating composition according to the present embodiment comprises a solvent, which is used as a carrier and provides easier application onto the substrate. Suitable solvents are those that provide high solubility with respect to the hotmelt composition according to the present invention and the solvent should have sufficiently low vapor pressure to provide relatively fast drying after application onto the print substrate. Examples of suitable solvents are organic solvents such as acetone, methanol, ethanol, toluene and MEK.

Methods of Use and Reuse of Print Media

In a further aspect, the present invention relates to methods of use and reuse of print media according to the present invention. The methods of use constitute a method of printing and a method of recycling (i.e. removing and reapplying a sacrificial layer onto the print substrate) and a combination thereof.

In an embodiment, a method of printing comprises the steps of:
  providing a reusable print medium according to the present invention or as obtained by a method of manufacturing a reusable print medium according to the present invention;
  imagewise printing a marking material onto the sacrificial layer of the reusable print medium, using a printing technique selected from the group consisting of electrophotographic printing, offset printing, screen printing, ink-jet printing.

In an embodiment, the method of printing comprises the step of ink-jet printing, preferably with a hotmelt ink composition or a UV-curable ink composition. In the latter case the method further comprises the step of curing the printed image.

In an embodiment, a method of recycling a reusable print medium according to the present invention or as obtained from a method of manufacturing a reusable print medium according to the present invention, the reusable print medium comprising a first side comprising a sacrificial layer and optionally a printed image, printed thereon according to a method according to the present invention, the method comprising the steps of:
heating at least the first side of the reusable print medium such that the sacrificial layer at least partly liquefies;
stripping the sacrificial layer optionally including the printed image from the printed reusable print medium.

In an embodiment, the sacrificial layer including the printed image is mechanically stripped from the printed reusable print medium.

In an embodiment, the sacrificial layer is cooled below the glass transition temperature of the hotmelt composition and then mechanically stripped from the print substrate. In this embodiment, the sacrificial layer becomes brittle and may be easily mechanically removed, for example by bending the substrate such that the sacrificial layer breaks and delaminates from the substrate.

In an embodiment, the method of recycling the print medium further comprises the steps of:
applying a new sacrificial layer by performing the steps of the method of manufacturing a reusable print medium according to the present invention;
imagewise printing a marking material onto the new sacrificial layer of the reusable print medium, using a printing technique selected from the group consisting of electrophotographic printing, offset printing, screen printing, ink-jet printing;
wherein the method is performed with a single apparatus comprising a device arranged for removing the sacrificial layer including the printed image, a device for applying a sacrificial layer and a printing device for imagewise printing a marking material onto the sacrificial layer of the reusable print medium.

In another aspect of the present invention, an apparatus suitable for performing the method of recycling a reusable print medium according to the present invention or as obtained from a method of manufacturing a reusable print medium according to the present invention is provided for, wherein the apparatus comprises a device arranged for removing the sacrificial layer including the printed image. The device for removing the sacrificial layer including the printed image may comprise a heating means and a stripping means. The heating means may for example be a conductive heater and/or a hot air heater and/or an infrared (IR) radiation heater. The stripping means may comprise a stripping blade (scraper), (adhesive) stripping roller, a wiper (comprising a woven or non-woven fabric).

Heating and stripping may also be performed in a single step process by immersing the used print substrate in a heated stripping liquid, the stripping liquid preferably being water optionally containing a stripping agent (e.g. surfactants).

In an embodiment, the apparatus further comprises a device for applying a sacrificial layer onto the print substrate.

Such a device may comprise a roller coater, a spray coater or a printing device, e.g. screen printing device and in particular an inkjet printing device.

In an embodiment, the apparatus further comprises a printing device for imagewise printing a marking material onto the sacrificial layer of the reusable print medium. Examples of suitable printing devices are an electrophotographic printing device, an offset printing device, a screen printing device and an ink-jet printing device. The apparatus preferably comprises an ink-jet printing device. The apparatus according to the present embodiment constitutes a printer capable of in-line recycling of reusable print media according to the present invention.

BRIEF DESCRIPTION OF THE DRAWINGS

The present invention will become more fully understood from the detailed description given herein below and accompanying schematical drawings which are given by way of illustration only and are not limitative of the invention, and wherein.

DETAILED DESCRIPTION OF THE DRAWINGS

Figure 1:
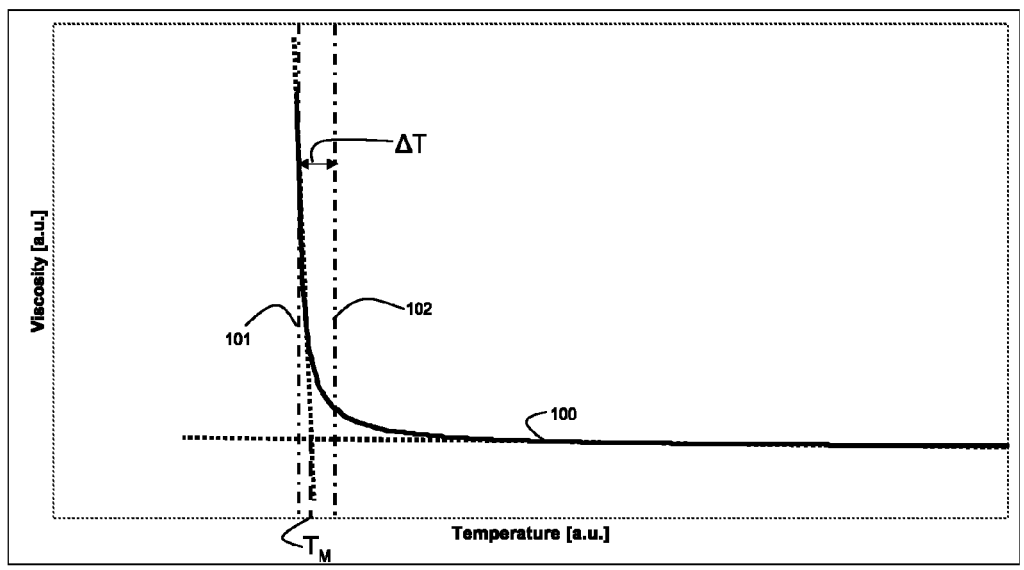
FIG. 1 shows a schematic representation of a melting curve of a hotmelt composition according to the present invention.

FIG. 1 shows a schematic representation of a melting curve 100 of a hotmelt composition comprising an amorphous material according to the present invention. The melting curve is represented as the viscosity (y-axis) as a function of the temperature (x-axis). Both viscosity and temperature are represented in arbitrary units [a.u.].

FIG. 1 shows that the hotmelt composition is solid at low temperatures (viscosity asymptocally approaches infinity)

FIG. 1 also shows that the viscosity drastically decreases around the melting point ($T_M$) of the hotmelt composition. The lower the viscosity at elevated temperatures, the better a sacrificial layer comprising such hotmelt composition can be removed at elevated temperatures, for example by scraping or wiping.

FIG. 1 further shows that the solid-liquid transition of the hotmelt composition is sharp, which means that the phase change of the hotmelt composition occurs in a relatively small temperature window (indicated with lines 101 and 102 and $\Delta T$) and that below the melting temperature ($T_M$) of the hotmelt composition, the hotmelt composition comprising the amorphous resin is capable of forming a stable solid layer on top of a print substrate.

Figure 2A:
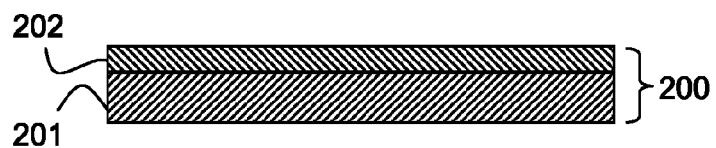
FIG. 2A shows a schematic representation of a reusable print medium.
Figure 2B:
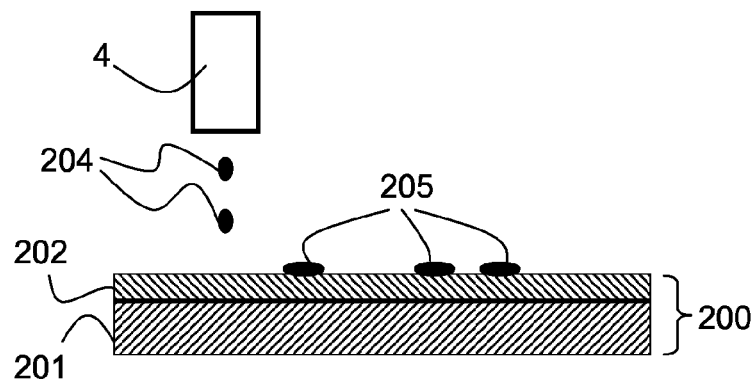
FIG. 2B shows a schematic representation of a process of printing onto a sacrificial layer of a reusable print medium.

FIG. 2A shows a reusable print medium, which is a laminate 200 comprising a substrate 201 and a sacrificial layer 202 comprising a hotmelt composition comprising an amorphous material. FIG. 2B shows a process of printing onto the sacrificial layer of a reusable print medium according to the present invention. Ink dots 205 are imagewise printed by expelling droplets 204 of an ink composition from an inkjet printing device 4 in accordance with the image to be printed.

Figure 2C:
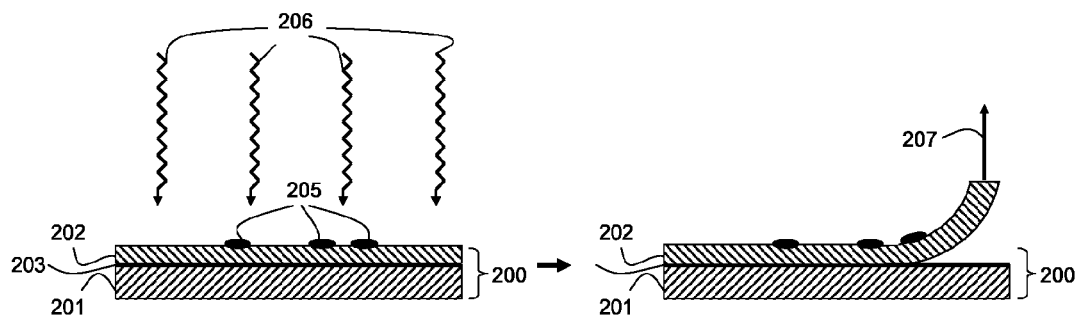
FIG. 2C shows a schematic representation of a process for removing a sacrificial layer.
Figure 2D:
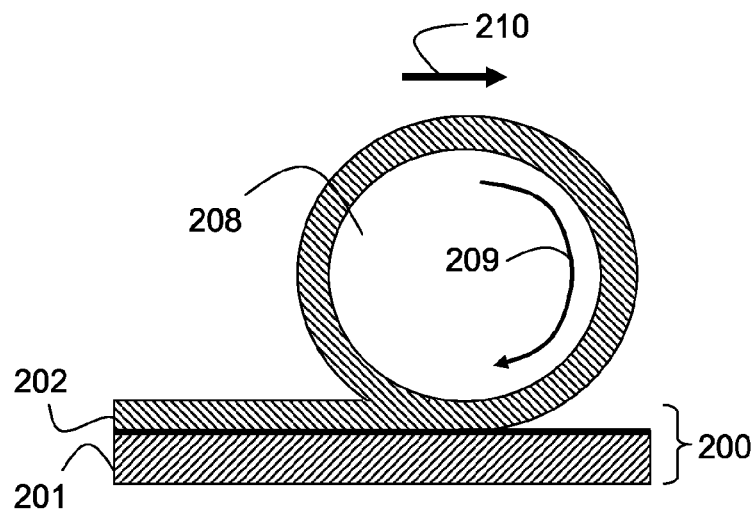
FIG. 2D shows a schematic representation of a process for applying a new sacrificial layer.

FIG. 2C shows a process for removing the sacrificial layer. Heat is applied to the used (i.e. comprising a printed image) print medium, which is indicated with arrows 206. Radiation may be absorbed by the sacrificial layer itself and converted into heat leading to at least partial softening or even melting of the sacrificial later. When the sacrificial layer is at least to some extent transparent with respect to the IR-radiation, the IR-radiation may be at least partly absorbed and converted into heat. Due to the (at least partial) transparency of the sacrificial layer and the absorption of the heat at the interface 203 of the print substrate and the sacrificial layer, the material of the sacrificial near that interface is heated until it melts. The sacrificial layer including the printed image delaminates from the substrate and is peeled from the substrate, as indicated with arrow 207. FIG. 2D shows a process for applying a new sacrificial layer. In the present example a new sacrificial layer is applied by a roller coater 208, which rotates in the direction as indicated with arrow 209 and moves in a direction indicated with arrow 210. Instead of moving the roller, the substrate may be moved underneath the roller coater in a direction opposite to the direction as indicated with arrow 210. A new sacrificial layer may however be applied in many various ways, among which, by spray coating, by printing, in particular inkjet printing. The reusable print medium is then ready to be printed on again (FIG. 2B).

Figure 3A:
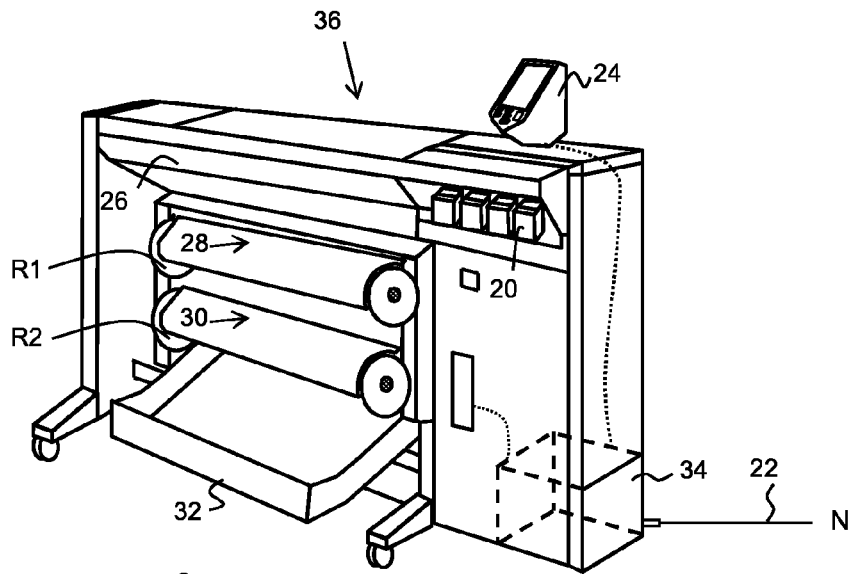
FIG. 3A shows a schematic representation of an image forming apparatus.
Figure 3B:
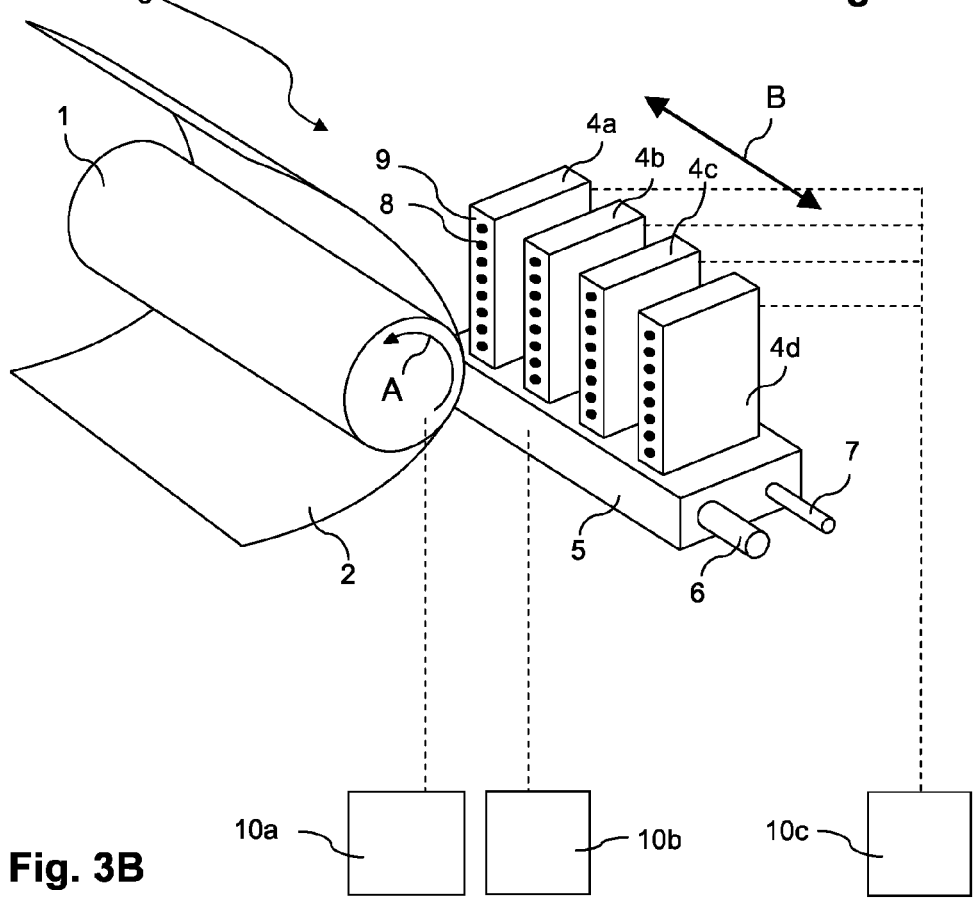
FIG. 3B shows a schematic representation of an ink jet printing assembly.

FIG. 3A shows an image forming apparatus 36, wherein printing is achieved using a wide format inkjet printer. The wide-format image forming apparatus 36 comprises a housing 26, wherein the printing assembly, for example the ink jet printing assembly shown in FIG. 3B is placed. The image forming apparatus 36 also comprises a storage means for storing image receiving member 28, 30, a delivery station to collect the image receiving member 28, 30 after printing and storage means for marking material 20. In FIG. 3A, the delivery station is embodied as a delivery tray 32. Optionally, the delivery station may comprise processing means for processing the image receiving member 28, after printing, e.g. a folder or a puncher. The wide-format image forming apparatus 36 furthermore comprises means for receiving print jobs and optionally means for manipulating print jobs. These means may include a user interface unit 24 and/or a control unit 34, for example a computer.

Images are printed on an image receiving member, for example paper, supplied by a roll 28, 30. The roll 28 is supported on the roll support R1, while the roll 30 is supported on the roll support R2. Alternatively, cut sheet image receiving members may be used instead of rolls 28, 30 of image receiving member. Printed sheets of the image receiving member, cut off from the roll 28, 30, are deposited in the delivery tray 32.

Each one of the marking materials for use in the printing assembly are stored in four containers 20 arranged in fluid connection with the respective print heads for supplying marking material to said print heads.

The local user interface unit 24 is integrated to the print engine and may comprise a display unit and a control panel. Alternatively, the control panel may be integrated in the display unit, for example in the form of a touch-screen control panel. The local user interface unit 24 is connected to a control unit 34 placed inside the printing apparatus 36. The control unit 34, for example a computer, comprises a processor adapted to issue commands to the print engine, for example for controlling the print process. The image forming apparatus 36 may optionally be connected to a network N. The connection to the network N is diagrammatically shown in the form of a cable 22, but nevertheless, the connection could be wireless. The image forming apparatus 36 may receive printing jobs via the network. Further, optionally, the controller of the printer may be provided with a USB port, so printing jobs may be sent to the printer via this USB port.

FIG. 3B shows an ink jet printing assembly 3. The ink jet printing assembly 3 comprises supporting means for supporting an image receiving member 2. The supporting means are shown in FIG. 3B as a platen 1, but alternatively, the supporting means may be a flat surface. The platen 1, as depicted in FIG. 3B, is a rotatable drum, which is rotatable about its axis as indicated by arrow A. The supporting means may be optionally provided with suction holes for holding the image receiving member in a fixed position with respect to the supporting means. The ink jet printing assembly 3 comprises print heads 4a-4d, mounted on a scanning print carriage 5. The scanning print carriage 5 is guided by suitable guiding means 6, 7 to move in reciprocation in the main scanning direction B. Each print head 4a-4d comprises an orifice surface 9, which orifice surface 9 is provided with at least one orifice 8. The print heads 4a-4d are configured to eject droplets of marking material onto the image receiving member 2. The platen 1, the carriage 5 and the print heads 4a-4d are controlled by suitable controlling means 10a, 10b and 10c, respectively. In an embodiment of the present invention, one of the print heads 4a-4d may be configured to eject droplets of the coating composition comprising an amorphous resin according to the present invention. In an embodiment, one of the print heads 4a-4d may be arranged for and configured to eject droplets of the coating composition comprising an amorphous resin (in particular in a hotmelt composition) according to the present invention. In these embodiments, a sacrificial layer is applied by ink jet printing prior to printing an image of marking material thereon. The sacrificial layer may also be applied by using a separate carriage (not shown, but similar to carriage 5) comprising one or more print heads (not shown) arranged for and configured to eject droplets of the coating composition comprising an amorphous resin (in particular in a hotmelt composition) according to the present invention.

The image receiving member 2 may be a medium in web or in sheet form and may be composed of e.g. paper, cardboard, label stock, coated paper, plastic or textile. Alternatively, the image receiving member 2 may also be an intermediate member, endless or not. Examples of endless members, which may be moved cyclically, are a belt or a drum. The image receiving member 2 is moved in the sub-scanning direction A by the platen 1 along four print heads 4a-4d provided with a fluid marking material.

A scanning print carriage 5 carries the four print heads 4a-4d and may be moved in reciprocation in the main scanning direction B parallel to the platen 1, such as to enable scanning of the image receiving member 2 in the main scanning direction B. Only four print heads 4a-4d are depicted for demonstrating the invention. In practice an arbitrary number of print heads may be employed. In any case, at least one print head 4a-4d per color of marking material is placed on the scanning print carriage 5. For example, for a black-and-white printer, at least one print head 4a-4d, usually containing black marking material is present. Alternatively, a black-and-white printer may comprise a white marking material, which is to be applied on a black image-receiving member 2. For a full-color printer, containing multiple colors, at least one print head 4a-4d for each of the colors, usually black, cyan, magenta and yellow is present. Often, in a full-color printer, black marking material is used more frequently in comparison to differently colored marking material. Therefore, more print heads 4a-4d containing black marking material may be provided on the scanning print carriage 5 compared to print heads 4a-4d containing marking material in any of the other colors. Alternatively, the print head 4a-4d containing black marking material may be larger than any of the print heads 4a-4d, containing a differently colored marking material.

The carriage 5 is guided by guiding means 6, 7. These guiding means 6, 7 may be rods as depicted in FIG. 3B. The rods may be driven by suitable driving means (not shown). Alternatively, the carriage 5 may be guided by other guiding means, such as an arm being able to move the carriage 5. Another alternative is to move the image receiving material 2 in the main scanning direction B.

Each print head 4a-4d comprises an orifice surface 9 having at least one orifice 8, in fluid communication with a pressure chamber containing fluid marking material provided in the print head 4a-4d. On the orifice surface 9, a number of orifices 8 is arranged in a single linear array parallel to the sub-scanning direction A. Eight orifices 8 per print head 4a-4d are depicted in FIG. 3B, however obviously in a practical embodiment several hundreds of orifices 8 may be provided per print head 4a-4d, optionally arranged in multiple arrays. As depicted in FIG. 3B, the respective print heads 4a-4d are placed parallel to each other such that corresponding orifices 8 of the respective print heads 4a-4d are positioned in-line in the main scanning direction B. This means that a line of image dots in the main scanning direction B may be formed by selectively activating up to four orifices 8, each of them being part of a different print head 4a-4d. This parallel positioning of the print heads 4a-4d with corresponding in-line placement of the orifices 8 is advantageous to increase productivity and/or improve print quality. Alternatively multiple print heads 4a-4d may be placed on the print carriage adjacent to each other such that the orifices 8 of the respective print heads 4a-4d are positioned in a staggered configuration instead of in-line. For instance, this may be done to increase the print resolution or to enlarge the effective print area, which may be addressed in a single scan in the main scanning direction. The image dots are formed by ejecting droplets of marking material from the orifices 8.

Upon ejection of the marking material, some marking material may be spilled and stay on the orifice surface 9 of the print head 4a-4d. The ink present on the orifice surface 9, may negatively influence the ejection of droplets and the placement of these droplets on the image receiving member 2. Therefore, it may be advantageous to remove excess of ink from the orifice surface 9. The excess of ink may be removed for example by wiping with a wiper and/or by application of a suitable anti-wetting property of the surface, e.g. provided by a coating.

EXAMPLES

Materials

All chemicals were obtained from Sigma-Aldrich and used as received (unless stated otherwise).

Measurement Techniques

Differential Scanning Calorimetry (DSC)

The $T_g$ is determined according to ASTM E 1356-03 with differential scanning calorimetry and measured with a TA instruments Q2000. The prepared sample was heated at a rate of 20° C./min. The onset of the $T_g$ was determined during a second run (i.e. sample was heated and cooled first before starting the measurement). The $T_g$ is a secondary transition and can be determined by analyzing the deflection point of the DSC curve.

The melting points were determined during a first heating run. The crystallization temperatures were determined during a first cooling run.

Size Exclusion Chromatography (SEC)

Molecular Weight ($M_n$ and $M_w$)

For determination of the molecular weight (number averaged molecular weight and the weight averaged molecular weight) of the amorphous material according to the present invention, Size Exclusion Chromatography (SEC) is used. First the sample has to be dissolved in tetrahydrofuran (THF; Rathburn, unstabilized). When the polymer in THF is cloudy it has to be centrifuged. The solution is measured with the following conditions:

eluent THF (unstabilized)+1% acetic acid
flow 0.7 ml/min
column: 1×PL-gel pre column-2×PL-gel Mixed C ($d_p$=5 μm, 7.5×300 mm at 40° C.
injection volume 50 μL The Refractive index signal of the detector (Viscotek TriSec model 302) is used. With a polystyrene conventional calibration the molecular weight is determined.

Rheometry

The viscosity of molten amorphous materials and hotmelt compositions was measured with a HAAKE Rheostress RS 600 rheometer equipped with a HAAKE Universal Temperature Controller using plate-plate geometry sensor system (PP60) at 140° C. (or a temperature as indicated with the measurement) (CR Method).

Experiment 1: Preparation of a Amorphous Resin of Diisopropanol Amine and Benzoic Acid This Experiment describes a process for making product No. 1 from Table 3, the process also being suitable for making comparable reaction products, particularly products 2 to 5 as shown in Table 3.

Synthesis of product No. of Table 3 was carried out as follows: A 250 ml 3-neck round-bottom flask was provided with a mechanical agitator, a thermometer and a DeanStark arrangement. 64.97 g (0.488 mol) of di-isopropanolamine (Aldrich) and 178.70 g (1.463 mol) benzoic acid (Aldrich) were placed in the flask. A small quantity of o-xylene was also added, about 20 ml, as entraining agent to remove the liberated water. The reaction mixture was heated to 180° C. and kept under a nitrogen atmosphere. After half an hour, the temperature was again raised to 190° C. After three hours, the flask was evacuated to remove the o-xylene. When the o-xylene had been removed, after about three-quarters of an hour, the reaction mixture was drawn off. This mixture contained mainly product 1 (Table 3), this product being identical to the product shown in FIG. 4 with n=0.

The prepared copolymer has a $T_g$ of 7° C., a viscosity at 150° C. of 8 mPa·s.

Figure 4:
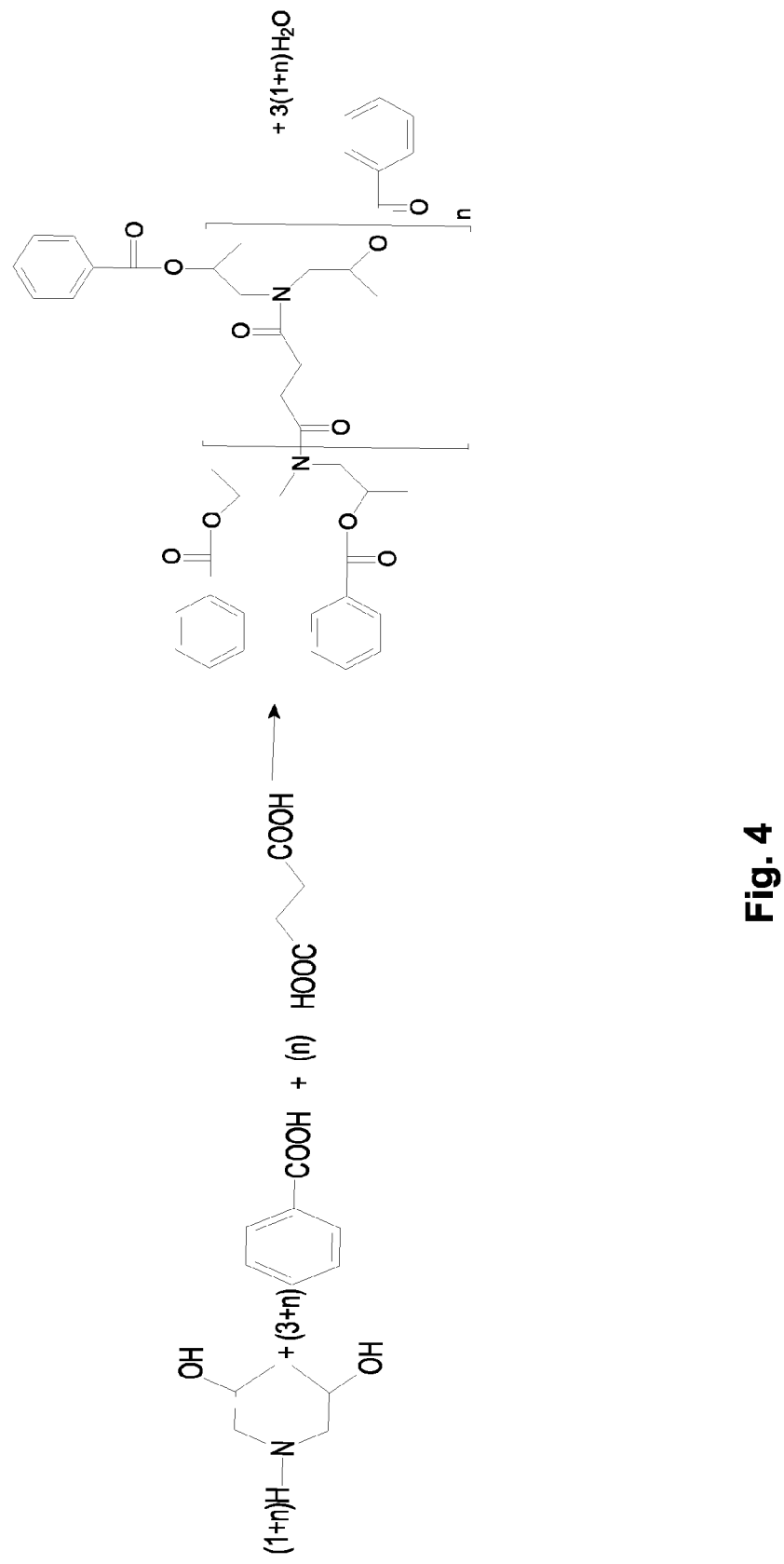
FIG. 4 schematically shows a reaction scheme regarding the preparation of a resin for use in a sacrificial layer according to an embodiment of the present invention as described in Experiment 1 (n=0) and Experiment 2.

Experiment 2: Preparation of a Amorphous Resin of Diisopropanol Amine, Succinic Acid Anhydride and Benzoic Acid A 1 liter reaction flask was provided with a mechanical agitator, a thermometer and a Dean Stark arrangement. 261.06 g (1.960 mol, 2.8 equivalents) of di-isopropanolamine (type S, BASF); 69.69 g (0.696 mol, 1 equivalent) of succinic acid anhydride (Aldrich); and 540.88 g (4.429 mol, 6.4 equivalents) benzoic acid (Aldrich) were placed in the flask. A small quantity of o-xylene, about 60 ml, was added as entraining agent to remove the liberated water. The reaction mixture was kept under a nitrogen atmosphere and heated for 1 hour at 165° C., where after the reaction temperature was raised to 180° C. After 6 hours the temperature was reduced to 160° C. and the flask was evacuated to remove the o-xylene. It was possible to draw off the reaction mixture after about 1 hour. Analysis showed that the number-averaged molecular weight ($M_n$) was 583 and the weight-averaged molecular weight ($M_w$) was 733. The ratio between $M_w$ and $M_n$ (1.26) showed that there was a mixture of compounds formed. The reaction scheme as shown in FIG. 4 indicates what compounds may form during the reaction between di-isopropanolamine, benzoic acid and succinic acid (it should be noted that the reaction product as shown in the reaction scheme of FIG. 4 is the most probable structure of the resulting compounds). The reaction shows the formation of a mono-disperse compound. The ratio in respect of reactants as indicated in the formula belongs to a chosen value for n. This ratio need not necessarily be identical to the ratio for the overall reaction, where in fact a mixture of compounds with different values for n is formed. In the reaction according to this experiment, a ratio has been chosen which is equal to 2.82:6.36:1 (di-isopropanolamine:benzoic acid:succinic acid anhydride). This means that there are 3×2.82=8.46 mol equivalents of reactive NH/OH groups in the amine, as against 6.36+2×1.00=8.36 mol equivalents of acid groups in the benzoic acid and anhydride. There is therefore only a very small excess (about 1%) of di-isopropanolamine.

A GPC analysis showed that the mixture contained approximately 45% by weight of the compound with n=0, about 40% by weight of the compound with n=1 and about 15% by weight of compounds with n=2 or higher. This is approximately equivalent to 60 mol. % of the compound with n=0; 30 mol. % of the compound with n=1 and 10 mol. % of compound with n=2 or higher.

The prepared copolymer has a $T_g$ of 17° C., a viscosity at 140° C. of 30 mPa·s and a measured molecular weight ($M_w$) of 733 gram/mole.

Other amorphous resins for use as a component in sacrificial layers of reusable print media according to the invention can be made in a similar manner to that given in Experiment 2. Changes in the ratio of the reactants or the type of reactants (for example an anhydride instead of the acid and/or vice-versa) may influence the synthesis. In this way, the skilled man can obtain an amorphous resin tailored to his purpose.

Experiment 3: Preparation of a Amorphous Resin of Glycerol, Cyclohexane-1,2-Dicarboxylic Acid and Benzoic Acid 10.0 g glycerol (0.109 mole; 6 equivalents), 15.6 g cyclohexane-1,2-dicarboxyllic acid (0.091 mole; 5 equivalents) and 17.7 g benzoic acid (0.145 mole; 8 equivalents) was brought under nitrogen atmosphere into a round-bottom flask equipped with a Dean-Stark trap. 20 ml of xylene was added. The mixture was then heated to 200° C. and stirred for 2 days. The conversion was monitored by monitoring the amount of water present in the Dean-Stark trap.

After the reaction was completed, the water was removed from the Dean Stark trap and the xylene was removed in a rotavap. Since xylene forms an azeotropic mixture with water, the last traces of water were also removed upon removal of the xylene. The last traces of xylene as well as unreacted monomer was removed by heating the reaction mixture to 150° C. for another 8 hours under vacuum (i.e. at a pressure of at most $10^{-2}$ mbar).

The prepared copolyester has a $T_g$ of 25° C., a viscosity at 140° C. of 354 mPa·s and a measured molecular weight ($M_w$) of 2760 gram/mole.

Experiments 4-16: Preparation of a Amorphous Resins According to the Present Invention Several other copolyesters in accordance with the present invention were synthesized in a similar way as describes above, by combining the desired amounts of the respective building blocks (A, B, C and optionally D) into the round-bottom flask equipped with a Dean-Stark trap, in experiments 4-16, respectively.

Non-limiting examples of copolyesters in accordance with the present invention are summarized in Table 8. The properties are summarized in Table 9.

TABLE 8 copolymers (amorphous material) according to the present invention (composition)

| Exp. | 1$^{st}$ monomer A | 2$^{nd}$ monomer B | 3$^{rd}$ monomer C | 4$^{th}$ monomer D | molar ratio A:B:C:D |
|---|---|---|---|---|---|
| 1 | diisopropanolamine | benzoic acid | — | — | 1:3:0:0 |
| 2 | diisopropanolamine | benzoic acid | succinic acid | — | 2.8:6.4:1:0 |
| 3 | glycerol | benzoic acid | cyclohexane-1,2-dicarboxyllic acid | — | 6:8:5:0 |
| 4 | glycerol | benzoic acid | cyclohexane-1,2-dicarboxyllic acid | — | 3:5:2:0 |
| 5 | glycerol | benzoic acid | phthalic anhydride | — | 6:8:5:0 |
| 6 | glycerol | benzoic acid | phthalic anhydride | — | 3:5:2:0 |
| 7 | pentaerythritol | benzoic acid | glutaric acid | — | 2:6:1:0 |
| 8 | glycerol | benzoic acid | cyclohexane-1,4-dicarboxyllic acid | — | 3:5:2:0 |
| 9 | glycerol | benzoic acid | succinic anhydride | — | 6:8:5:0 |
| 10 | glycerol | 4-$^{tert}$-butyl-benzoic acid | succinic anhydride | — | 2:4:1:0 |
| 11 | glycerol | 4-$^{tert}$-butyl-benzoic acid | succinic anhydride | — | 3:5:2:0 |
| 12 | glycerol | 4-$^{tert}$-butyl-benzoic acid | succinic anhydride | — | 4:6:3:0 |
| 13 | 2-ethyl-2-(hydroxymethyl)-propane-1,3-diol | benzoic acid | succinic anhydride | — | 3:5:2:0 |
| 14 | pentaerythritol | benzoic acid | — | 3-methyl benzoic acid, 4-methyl benzoic acid (1:1) | 3:4:0:8 |
| 15 | glycerol | benzoic acid | lactic acid | — | 1:3:15:0 |
| 16 | glycerol | benzoic acid | lactic acid | — | 1:3:30:0 |

TABLE 9 copolymers (amorphous material) according to the present invention (properties)

| Exp. | $M_w$ (theo-retical) (g/mol) | $M_n$ (measured) (g/mol) | $M_w$ (measured) (g/mol) | $M_w/M_n$[1] (—) | $\eta$ (140° C.) (mPa·s) | $T_g$[2] (° C.) |
|---|---|---|---|---|---|---|
| 1 | n.a.[3] | — | — | — | 8[5] | 7 |
| 2 | n.a.[3] | 583 | 733 | 1.26 | 30 | 17 |
| 3 | 2064 | 930 | 2760 | 3.0 | 354 | 25 |
| 4 | 1068 | n.d.[4] | n.d.[4] | — | 79 | 13 |
| 5 | 2034 | 870 | 2690 | 3.1 | 457 | 28 |
| 6 | 1056 | 600 | 1130 | 1.9 | 98 | 13 |
| 7 | 992 | n.d.[4] | n.d.[4] | — | 90 | 20 |
| 8 | 1068 | n.d.[4] | n.d.[4] | — | 104 | 9 |
| 9 | 1794 | n.d.[4] | n.d.[4] | — | 182 | 12 |
| 10 | 906 | n.d.[4] | n.d.[4] | — | 135 | 30 |
| 11 | 1240 | n.d.[4] | n.d.[4] | — | 225 | 28 |
| 12 | 1574 | n.d.[4] | n.d.[4] | — | 342 | 31 |
| 13 | 1086 | n.d.[4] | n.d.[4] | — | 82 | nd |
| 14 | 589 | 450 | 470 | 1.0 | 26 | 12 |
| 15 | 1540 | n.d.[4] | n.d.[4] | — | 70 | 22 |
| 16 | 2564 | n.d.[4] | n.d.[4] | — | 180 | 32 |

[1] polydispersity factor
[2] glass transition temperature
[3] n.a. = not available
[4] n.d. = not determined
[5] determined at 150° C.

Experiments 17-26 Preparation of Hotmelt Compositions

Hotmelt compositions are prepared by melt mixing the components as shown in Table 10.

Corresponding amounts of components were combined in a vessel and heated to 150° C. and mixed. The mixture was stirred until all material had melted. The resulting fluid was filtered over a filter having pores in the range of 0.7-1.2 μm. The filtered hotmelt composition was allowed to cool down to room temperature, during which the hotmelt composition solidified.

TABLE 10 hotmelt compositions

| Exp. | Amorphous material | Crystalline material |
|---|---|---|
| 17[1] | Compound of Experiment 2 (34 wt %) | Compound 8, Table 6 (61 wt %) [obtained from Hexion] |
| 18 | Compound of experiment 3 (10 wt %) Compound of experiment 4 (30 wt %) | Compound 10 of Table 5 (10 wt %) Compound 1 of Table 5 with n = 9 (50 wt %) |
| 19 | Compound of experiment 3 (20 wt %) Compound of experiment 13 (20 wt %) | Compound 10 of Table 5 (10 wt %) Compound 1 of Table 5 with n = 9 (50 wt %) |
| 20 | Compound of experiment 4 (10 wt %) Compound of experiment 5 (30 wt %) | Compound 10 of Table 5 (10 wt %) Compound 1 of Table 5 with n = 9 (50 wt %) |
| 21 | Compound of experiment 5 (40 wt %) | Compound 12 of Table 5 (10 wt %) Compound 9 of Table 5 with n = 4 (50 wt %) |
| 22 | Compound of experiment 15 (50 wt %) | Compound 5 of Table 5 with n = 6 (50 wt %) |
| 23 | Compound of experiment 3 (20 wt %) Compound of experiment 13 (20 wt %) | Compound 10 of Table 5 (10 wt %) Compound 1 of Table 5 with n = 8 (50 wt %) |
| 24 | Compound of Experiment 2 (40 wt %) | Compound 20 of Table 5 (20 wt %) Compound 1 of Table 5 with n = 9 (40 wt %) |

[1] the hotmelt composition of experiment 17 further comprises: a gelling agent: 3 wt % Pentaerythritol tetrastearaat, obtained from NOF corporation; and a nucleation agent: 2 wt % of compound gel-5, Table 6, obtained from Hexion Specialty Chemicals.

TABLE 11 properties of hotmelt compositions

| Exp. | Viscosity at 140° C. (mPa·s) | $T_g$ (° C.) | Melting points (° C.) | Crystallization temperatures (° C.) |
|---|---|---|---|---|
| 17 | 10.0 (at 130° C.) | 1 | 82 | 40 |
| 18 | 17.5 | 5 | 61, 73, 93 and 129 | 61 and 109 |
| 19 | 17.5 | 5 | 61, 73, 93 and 128 | 60 and 108 |
| 20 | 18.9 | 2 | 61, 74, 94, 129 | 60 and 110 |
| 21 | 14.4 | 6 | 57 and 110 | 35 and 53 |
| 22 | 8 | 15 | 88 | 61 |
| 23 | 18.2 | 4 | 58, 71, 91 and 128 | 58 and 112 |
| 24 | 12.2 | 4 | 58, 72, 91 and 123 | 52 and 103 |

Working Example 1

Applying a Sacrificial Layer to a Print Substrate

The amorphous material of experiment 2 was dissolved in acetone and applied to a rigid substrate with the aid of a roller coater as shown in FIG. 2D. The acetone was evaporated, resulting in a sacrificial layer applied to the substrate. The adhesion of the sacrificial layer to the substrate was excellent. Standard PVC foil (IJM672 Océ PVC Film) and laminated substrates, in particular of the Stratificato type, obtained from Abet Laminati.

Working Examples 2-5

Applying a Sacrificial Layer to a Print Substrate by Inkjet Printing

The hotmelt compositions of experiments 17, 19, 21 and 22 were printed onto a rigid acrylic substrate using an Océ-colorwave 600 printer. The hotmelt compositions were supplied to the printer in the solid phase and were melted in the printer. The adhesion of the sacrificial layer to the substrate was excellent.

Working Examples 6-10

Printing an Image on to the Sacrificial Layer

A full color image was printed onto the sacrificial layers as applied in working examples 1-5 using an Océ Arizona 360

GT printer (e.g. with a flat-bed ink jet printer using an UV-curable ink set), as schematically shown in FIG. 2B. The ink was cured with UV-radiation.

Working Examples 11-15

Removing the Sacrificial Layer Including the Printed Image

The sacrificial layers including the printed images were removed by heating the printed reusable print substrate. In a first embodiment by immersing the print medium in a hot water bath of 65-70° C. and wiping with a cloth. In a second embodiment by applying IR-radiation to above the melting point of the sacrificial layer and stripping the sacrificial layer including the printed image from the substrate as shown in FIG. 2C. Table 12 shows the removability of the sacrificial layer according to both embodiments.

TABLE 12 removability of the sacrificial layer

| Example | Material sacrificial layer | Immersion in hot water bath | IR radiation |
|---|---|---|---|
| 11 | Amorphous material of experiment 2 | excellent | excellent |
| 12 | Hotmelt composition of experiment 17 | moderate | excellent |
| 13 | Hotmelt composition of experiment 19 | good | excellent |
| 14 | Hotmelt composition of experiment 21 | excellent | excellent |
| 15 | Hotmelt composition of experiment 22 | moderate | good |

Due to the high melting point of the hotmelt composition according to experiments 17 and 22 (i.e. 88° C., see Table 11), a sacrificial layer comprising such hotmelt composition may be more difficult to remove in a hot water bath than sacrificial layers of a hotmelt composition having a lower melting point.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually and appropriately detailed structure. In particular, features presented and described in separate dependent claims may be applied in combination and any combination of such claims are herewith disclosed.

The invention claimed is:

1. A reusable print medium, comprising:
   a substrate and
   a sacrificial layer,
   the sacrificial layer comprising a hotmelt composition, wherein the hotmelt composition comprises an amorphous material which is a resin being a reaction product of
   a first monomer A, said first monomer A being a polyhydroxyl alcohol comprising X hydroxyl functional groups, wherein X≥2, monomer A optionally comprises a primary or secondary amine functionality;
   a second monomer B, being an aromatic monocarboxylic acid;
   a third monomer C, said third monomer C being able to form an ester linkage with an alcohol and/or an amide linkage with a primary or secondary amine; and
   optionally, a fourth monomer D, being an aromatic monocarboxylic acid different from the second monomer B.

2. The reusable print medium according to claim 1, wherein the amorphous material has a glass transition temperature of between −10° C. and 55° C.

3. The reusable print medium according to claim 1, wherein the hotmelt composition has a viscosity of below 150 mPa·s at 150° C.

4. The reusable print medium according to claim 1, wherein the hotmelt composition comprises:
   20 wt %-100 wt % of an amorphous material having a glass transition temperature ($T_g$) of between −10° C. and 55° C.;
   0 wt %-70 wt % of a crystalline material;
   0 wt %-10 wt % of a gelling agent;
   0 wt %-10 wt % of a germinating agent;
   0 wt %-10 wt % of a colorant; and
   0 wt %-10 wt % of a surfactant.

5. The reusable print medium according to claim 1, wherein the amorphous material is a resin being a reaction product of diisopropanol amine, succinic acid or its anhydride and benzoic acid.

6. A method of manufacturing a reusable print medium as defined in claim 1 by applying the sacrificial layer onto a substrate, the method comprising:
   applying a liquid coating composition to at least a part of a surface of the substrate, said liquid coating composition comprising a hotmelt composition, wherein the hotmelt composition comprises an amorphous material which is a resin being a reaction product of a first monomer A, said first monomer A being a polyhydroxyl alcohol comprising X hydroxyl functional groups, wherein X≥2, monomer A optionally comprises a primary or secondary amine functionality; a second monomer B, being an aromatic monocarboxylic acid; a third monomer C, said third monomer C being able to form an ester linkage with an alcohol and/or an amide linkage with a primary or secondary amine; and optionally, a fourth monomer D, being an aromatic monocarboxylic acid different from the second monomer B, so as to form the sacrificial layer on at least a part of the surface of the substrate.

7. The method according to claim 6, wherein the liquid coating composition is obtained by heating the hotmelt composition such that it melts.

8. The method according to claim 6, wherein the liquid coating composition further comprises a solvent, and wherein the method comprises the additional step of drying the coated surface by allowing the solvent to evaporate.

9. A coating composition comprising a solvent and a hotmelt composition according to claim 1 wherein the hotmelt composition comprises an amorphous material which is a resin being a reaction product of a first monomer A, said first monomer A being a polyhydroxyl alcohol comprising X hydroxyl functional groups, wherein X≥2, monomer A optionally comprises a primary or secondary amine functionality; a second monomer B, being an aromatic monocarboxylic acid; a third monomer C, said third monomer C being able to form an ester linkage with an alcohol and/or an amide linkage with a primary or secondary amine; and optionally, a fourth monomer D, being an aromatic monocarboxylic acid different from the second monomer B.

10. The coating composition according to claim 9, wherein the solvent is an organic solvent selected from the group consisting of acetone, methanol, ethanol, toluene and MEK.

11. A method of printing comprising the steps of:
providing (1) a reusable print medium as defined in claim 1, or (2) a reusable print medium as defined in claim 1, which is obtained by a method comprising: applying a liquid coating composition to at least a part of a surface of a substrate, said liquid coating composition comprising said hotmelt composition;
imagewise printing a marking material onto the sacrificial layer of the reusable print medium, using a printing technique selected from the group consisting of electrophotographic printing, offset printing, screen printing, and ink-jet printing.

12. A method of recycling (1) a reusable print medium as defined in claim 1, or (2) a reusable print medium as defined in claim 1, which is as obtained by a method comprising: applying a liquid coating composition to at least a part of a surface of a substrate, said liquid coating composition comprising said hotmelt composition, the reusable print medium comprising a first side comprising a sacrificial layer and optionally a printed image, printed thereon with a marking material using a printing technique selected from the group consisting of electrophotographic printing, offset printing, screen printing, and ink-jet printing, the method comprising the steps of
heating at least the first side of the reusable print medium such that the sacrificial layer at least partly liquefies; and
stripping the sacrificial layer optionally including the printed image from the printed reusable print medium.

13. The method according to claim 12, wherein the method further comprises the steps of:
applying a new sacrificial layer by applying said liquid coating composition to at least a part of a surface of the substrate;
imagewise printing a marking material onto the sacrificial layer of the reusable print medium, using a printing technique selected from the group consisting of electrophotographic printing, offset printing, screen printing, and ink jet printing;
wherein the method is performed with a single apparatus comprising a device arranged for removing the sacrificial layer including the printed image, a device for applying a sacrificial layer and a printing device for imagewise printing a marking material onto the sacrificial layer of the reusable print medium.

14. Apparatus suitable for performing the method of claim 13, the apparatus comprising:
a device arranged for removing the sacrificial layer, optionally including a printed image;
a device for applying a sacrificial layer, onto the print substrate;
a printing device for imagewise printing a marking material onto the sacrificial layer of the reusable print medium.

15. The reusable print medium according to claim 1, wherein the sacrificial layer is an intermediate layer between the substrate and a marking material to be applied to the sacrificial layer.

16. The reusable print medium according to claim 1, further comprising a marking material present on said sacrificial layer.

17. The reusable print medium according to claim 1, wherein when heat is applied to the reusable print medium, the sacrificial layer, or a fraction of the sacrificial layer located away from the substrate may be removed from the substrate.

18. The reusable print medium according to claim 17, wherein the sacrificial layer or the fraction of the sacrificial layer located away from the substrate may be removed by stripping or peeling.

* * * * *